United States Patent
Schwaiger

(10) Patent No.: US 10,398,979 B2
(45) Date of Patent: Sep. 3, 2019

(54) METHOD AND PROGRAM PRODUCT FOR FLUID MOSAIC TERRAIN GAMES

(71) Applicant: Jim Schwaiger, Huron, SD (US)

(72) Inventor: Jim Schwaiger, Huron, SD (US)

( * ) Notice: Subject to any disclaimer, the term of this patent is extended or adjusted under 35 U.S.C. 154(b) by 536 days.

(21) Appl. No.: 15/169,511

(22) Filed: May 31, 2016

(65) Prior Publication Data

US 2017/0340971 A1 Nov. 30, 2017

(51) Int. Cl.
*A63F 13/63* (2014.01)
*A63F 13/20* (2014.01)

(52) U.S. Cl.
CPC .............. *A63F 13/63* (2014.09); *A63F 13/20* (2014.09)

(58) Field of Classification Search
CPC ................................ A63F 13/63; A63F 13/20
USPC ........................................................ 463/31
See application file for complete search history.

(56) References Cited

U.S. PATENT DOCUMENTS

| | | | |
|---|---|---|---|
| 7,559,834 B1 | 7/2009 | York | |
| 8,452,721 B2 | 5/2013 | Cohen et al. | |
| 2004/0266529 A1* | 12/2004 | Chatani | A63F 13/12 463/40 |
| 2011/0307837 A1 | 12/2011 | Cohen et al. | |
| 2015/0105147 A1* | 4/2015 | Franzas | A63F 13/42 463/31 |

* cited by examiner

*Primary Examiner* — Omkar A Deodhar
*Assistant Examiner* — Wei Lee
(74) *Attorney, Agent, or Firm* — Ariel S. Bentolila; Bay Area IP Group, LLC

(57) ABSTRACT

A method and program product include assembling a player terrain tile for a player of a computer implemented environment. The computer implemented environment at least comprises a plurality of terrain tiles and a fluid mortar disposed about the plurality of terrain tiles. The player terrain tile and the plurality of terrain tiles each at least comprise a plurality of individual positional elements. The player terrain tile is add to the computer implemented environment within the fluid mortar. The player terrain tile is moved within the fluid mortar. Tile interaction is processed upon the player terrain tile engaging at least one of the plurality of terrain tiles.

20 Claims, 15 Drawing Sheets

METHOD AND PROGRAM PRODUCT FOR FLUID MOSAIC TERRAIN GAMES

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to territory-based games. More particularly, the invention relates to fluid mosaic terrain games.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typical terrain based games and/or simulations generally allow a user to move individual units or tiles over terrain. In some terrain based simulations, a user may own and/or change an area of terrain as well as interact with nearby terrain. Generally, terrain based simulations may comprise of a terrain map with discrete areas of terrain. Terrain maps may further comprise of borders around certain terrain areas and/or virtually any type of terrain features such as, without limitation, geography, interaction algorithms, and/or simulated resources. A user may place game or simulation units on certain terrains and move the units across different terrains and/or borders. A user may be limited in regards to moving user-owned terrain and/or traversing units or terrain across borders. Situations may occur wherein a user may be unable to move units and/or terrain because of nearby borders and/or surrounding terrain.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that some existing terrain-based games allow limited interaction between multiple users. Typically, terrain-based games may allow a user to move one or more units across any terrain, with user-owned terrain remaining in a static location. Additional users and/or terrain often may not be fairly added into an on-going game due to limited game or simulation resources.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1A:
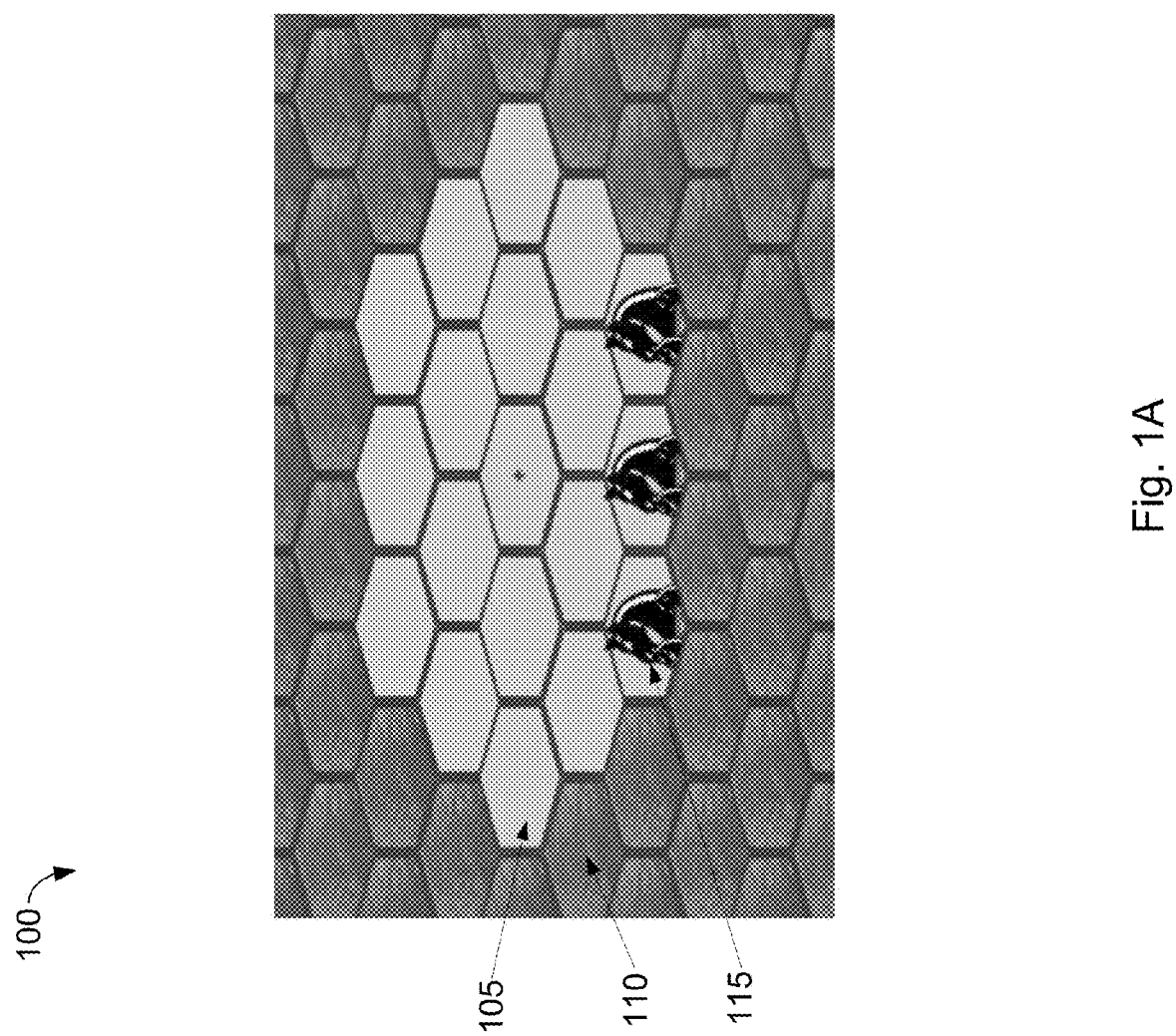
FIG. 1A illustrates of an exemplary system for a fluid mosaic terrain game, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for fluid mosaic terrain games. Some of these embodiments may comprise computer software. In some of these embodiments, software may be integrated into hardware, including, without limitation, uniquely-designed hardware for running embodiment software.

In many embodiments, and variations thereof, land may not be fixed in location, it may float through fluid mortar under the influence of the players. In many embodiments, and variations thereof, because player territories may be separated by variable fluid mortar, they may be able to expand and contract, especially by losing territory to adjacent tiles in combat. In many embodiments, and variations thereof, the fluid nature of terrain may allow or encourage a player to control multiple independently mobile tiles of different size and function. As a non-limiting example, a platoon tile is a large mother tile containing most of the sources of production, with multiple smaller tiles used for attack, trading and transport. In some embodiments, and variations thereof, on entering the game, a player may create or select a platoon of tiles that may be best suited for current conditions and the needs of his team. In some embodiments, and variations thereof, during the game, a player may reconfigure his platoon of tiles, perhaps by splitting off pieces of his mother tile to form small tiles for attack or trade. In some embodiments, and variations thereof, the player may also return with captured territory to be merged with his mother tile. In some embodiments, and variations thereof, members of the same team may transfer territory between players. In many embodiments, and variations thereof, the fluidity of a player's platoon of tiles may make his play, and interaction with others, more dynamic than a fixed terrain game.

In some embodiments, and variations thereof, permanent capture or transfer of territory through combat may allow a "partial victory" computed between two players, even in cases where multiple players are involved on each side, and this may allow Elo rating modifications. In some embodiments, and variations thereof, accurate player ratings may allow players to be more evenly matched, and may be a major source of player ego investment and aspiration. Fixed terrain games may lack the partial victory event and may not use Elo ratings for combat between more than two players.

Many embodiments, and variations thereof, may allow players to easily enter and exit ongoing games. Each time a player leaves an arena and saves his tile, he is preserving his progress, and his investment, until he returns. Many embodiments, and variations thereof, may allow players to warp time, by returning at a variable time in the future, with the game progressing in their absence. In some embodiments, and variations thereof, players may also warp space, since on their return, they may not be in the same location as they left and other players may be moving while they are gone. In many embodiments, and variations thereof, this fluidity may enhance the ability of players to seek out their favorite friends and opponents, again improving interaction.

Many embodiments, and variations thereof, may allow for many smaller stratified arenas where players may be matched on size and/or skill, creating more evenly matched play. In some embodiments, and variations thereof, theatres/arenas may also be coordinated to support a unified strategic game.

In many embodiments, and variations thereof, a cascade may combine stratified arenas with a unified (global) game. In a non-limiting example, new and small players may enter in the lowest level arena(s), and by winning may progress to the next higher arena(s), with strongest players eventually having a chance to reach the highest level. In some embodiments, and variations thereof, players may reach a desired size of his platoon of tiles by, but not limited to, adding, dropping or splitting tiles. In some embodiments, and variations thereof, communication and trade may occur between the arenas. In some embodiments, and variations thereof, player tiles entering upper arenas may be developed through success at lower levels, and the need for these reinforcements may compel players at upper levels to interact with (and help) players at the lower levels.

In many embodiments, and variations thereof, the fluid mortar between the tiles may not be empty space. In some embodiments, and variations thereof, the fluid may have the potential to be teeming with life. As a non-limiting example, from ships and creatures floating on its surface, to submarines and animals swimming below, and aircraft and dragons flying above, it may have all the potential of a fixed terrain sea. But because the seas in a fluid terrain game change shape and size like land in its tiles, the dynamic opportunities for player interaction may be increased.

In many embodiments, and variations thereof, a player who may want to leave combat without penalty may have to move his tile away from his enemy before doing so. In some embodiments, and variations thereof, the penalty may be sufficient to discourage a player from running away, and sufficient tribute to reward the player who scared the player running away.

In some embodiments, and variations thereof, bridges may form to cross short spaces separating the tiles, allowing a wider path for trade or combat. In some embodiments, this may occur under player control. In other embodiments, this may occur as a function of the game.

In some embodiments, and variations thereof, tile contours may be smoothed. In some embodiments, and variations thereof, contour smoothing may be under player control.

In some alternate embodiments, fluid mosaic terrain games may be presented in a three-dimensional space of fluid mortar with tiles moving three-dimensionally within the fluid mortar. As a non-limiting example, tiles may orbit or hover over other tiles or fluid mortar. As another non-limiting example, tiles may be situated under fluid mortar and other tiles may pass over. In some other alternate embodiments, fluid mosaic terrain games may be presented in a three-dimensional space of fluid mortar with discrete elevation levels to allow interaction of tiles on the same level.

FIG. 1A illustrates of an exemplary system for a fluid mosaic terrain game, in accordance with an embodiment of the present invention. A fluid mosaic terrain game 100 comprises of a terrain tile 105, a fluid mosaic terrain 110, and game units 115. A player may control one or more terrain tiles 105 which may comprise of smaller tile units. A terrain tile 105 may be represented by one or more smaller tiles that may be modularly added to the main terrain tile 105. A fluid mosaic terrain 110 comprises of a region of the fluid mosaic terrain game 100 that a terrain tile 105 may traverse over or through. Fluid mosaic terrain 110 may be virtually any area of fluid mosaic terrain game 100 such as, without limitation, a continuous and uniform area, a series of discrete areas comprising of one or more smaller tiles, specialized terrain tiles 105, etc. In some embodiments, fluid mosaic terrain 110 may be treated like sea, similar to fixed terrain games, allowing both land based and sea going units. Game units 115 may be placed on any terrain tile 105 and/or fluid mosaic terrain 110. Game units 115 may be virtually any game resource such as, without limitation, combat units, resource nodes, or noncombat units. In some embodiments, combat units may include, but not limited to, ground units such as, but not limited to, infantry, cavalry, armor, artillery, recon, elephants, etc., sea units such as but not limited to, ships, aircraft carriers, landing craft, aquatic animals, etc., air units such as, but not limited to, fighters, bombers, zeppelins, dragons, eagles, whales, etc., undersea units such as, but not limited to, submarines, fish. In some embodiments, noncombat units may be mobile such as, but not limited to, trucks and other cargo carriers, mobile barriers, headquarters, etc., and non-mobile such as, but not limited to, buildings, factories, supply depots, obstacles and defense works, etc.

During typical operation, a player may move an owned terrain tile 105 across a fluid mosaic terrain 110. A player-owned terrain tile 105 may interact with other game units 115 and/or other player terrain tiles 105 when a certain distance is reached. Additional player terrain tiles 105 may be added at any time to fluid mosaic terrain game 100 by expanding fluid mosaic terrain 110 and/or placing the added terrain tiles 105 in an unoccupied area of fluid mosaic terrain 110.

It may be appreciated by a person with ordinary skill in the art, in light of and in accordance with the teachings of the present invention, that all elements of a fluid mosaic terrain game 100 may be represented materially and/or virtually. In another embodiment of the present invention, mosaic terrain game 100 may be a physical game wherein all elements are game pieces placed on a game board. In yet another embodiment of the present invention, mosaic terrain game 100 may be entirely virtual, with all elements being displayed on a computer display and existing as data on a non-transitory computer readable medium. In an alternative embodiment of the present invention, some elements of mosaic terrain game 100 may be physical devices, such as specialized electronic hardware, that control and correspond to virtual elements on a computer display.

It may be appreciated by a person with ordinary skill in the art, in light of and in accordance with the teachings of the present invention, that a terrain tile 105 and/or a fluid mosaic terrain may be comprised of one or more tiles of any shape. Terrain tile 105 and/or a fluid mosaic terrain may be comprised of, without limitation, a group of adjacent square tiles, a group of hexagonal tiles, an amorphous area, hex, square, rectangle, rhombus, round or oval, or irregular. In another embodiment of the present invention, a terrain tile 105 may comprise of heterogeneously shaped smaller tiles and rearranged dynamically.

Figure 1B:
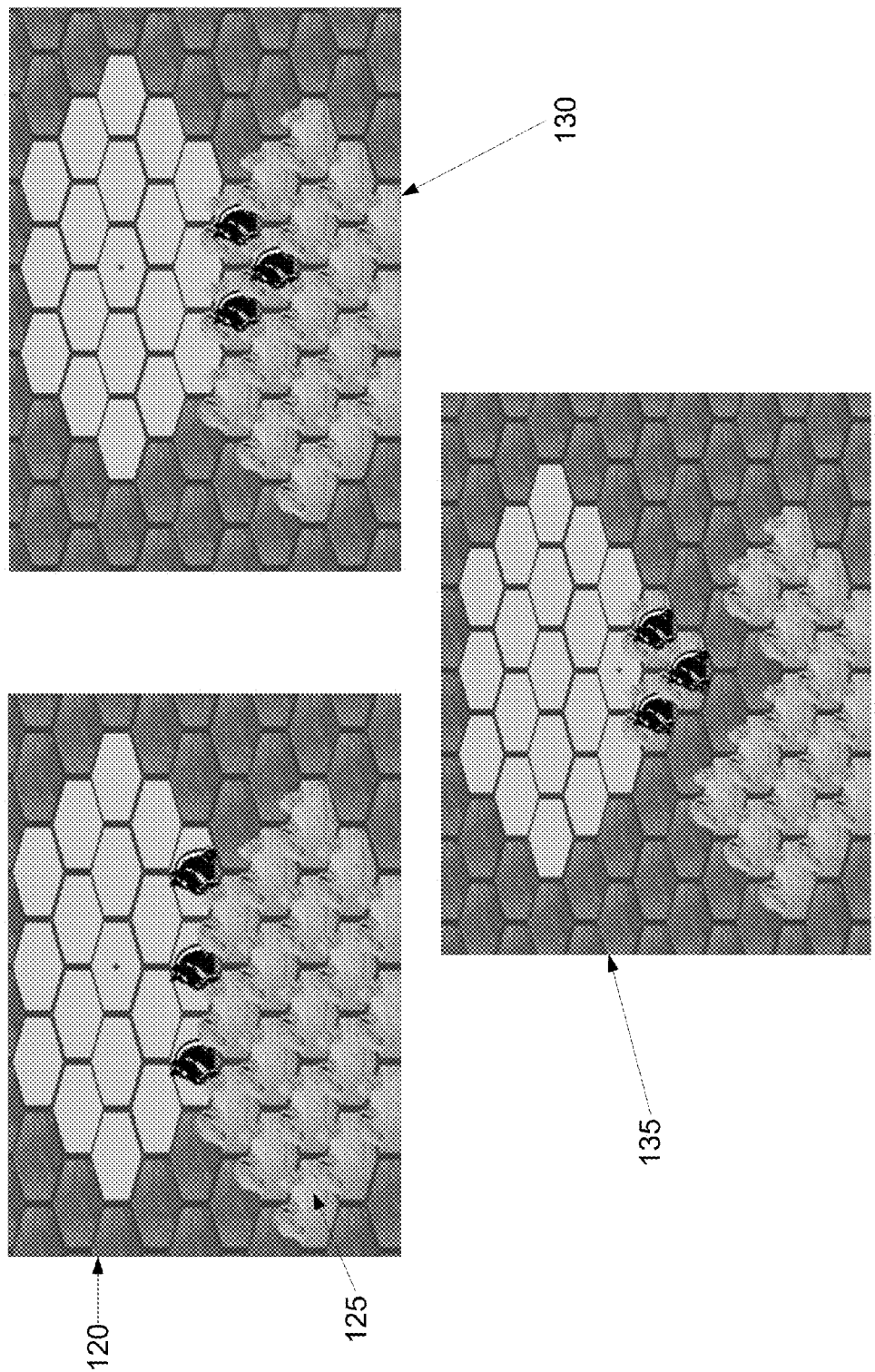
FIG. 1B illustrates tile movement in an exemplary system for a fluid mosaic terrain game, in accordance with an embodiment of the present invention.

FIG. 1B illustrates tile movement in an exemplary system for a fluid mosaic terrain game, in accordance with an embodiment of the present invention. In a fluid mosaic terrain game 120, a player-owned terrain tile 105 with game units 115 approaches a non-player owned terrain tile 125. When a player-owned terrain tile 105 is near or touching a non-player owned terrain tile 125, a player may send game units 115 to occupy part or all of the non-player owned terrain tile 125. A fluid mosaic terrain game 130 depicts a player sending three game units 115 to occupy three area units of a non-player owned terrain tile 125. Virtually any interaction may occur between a player's units and/or terrain tile 105 and a nearby terrain tile 125, such as, without limitation, changing the geometry of one or both terrain tiles, adding or removing area from one or more terrain tiles, moving both terrain tiles, merging areas from a nearby tile, separating area from a tile, directly adding or transferring hexes from a tile, removing/destroy hexes within a tile. In some embodiments, changes to tiles may occur through interaction between players, but may also occur by a player directly editing his tile(s), depending on the rules of the specific game. A fluid mosaic terrain game 135 depicts a player's game units 115 capturing three area units of an adjacent terrain tile 125 and adding the captured area to the player's terrain tile 105. In some embodiments, the capturing may occur from player owned and non-player owned tiles.

It may be appreciated by a person with ordinary skill in the art, in light of and in accordance with the teachings of the present invention, that virtually any interactions may be performed between two terrain tiles. Interactions may be, without limitation, capturing area from a terrain tile, removing or adding game units to a terrain tile, changing the geometry of a terrain tile, or movement of game units or resources from one tile to another, for purposes of combat or trade. In another embodiment of the present invention, two adjacent terrain tiles may trade tile area, game units, and/or resources.

It may be appreciated by a person with ordinary skill in the art, in light of and in accordance with the teachings of the present invention, that virtually any movement algorithms may be implemented when a player moves a terrain tile. Movement algorithms may include such as, but not limited to, physical movement simulations, movement speed weighting, or game specific algorithms. In some embodiments, tiles may be moved implicitly by weighted position of units/structures on the tile, or explicitly by use of propulsive units/structures such as fans, without limitation, propellers, jets, etc. In some embodiments, regardless of the source of propulsive force, a net velocity may be inversely proportional to a mass of a tile where smaller tiles move more quickly than larger tiles. Tile movement may also be influenced in some games by directional currents in the fluid mortar. In some embodiments, games may allow rotation of tiles, sometimes controlled/influenced by users. In another embodiment of the present invention, a terrain tile 105 may move at a speed determined by metadata associated with a fluid mosaic terrain 110. In yet another embodiment of the present invention, a terrain tile may move by pivoting around a specific point, regardless of physical realism.

Figure 2:
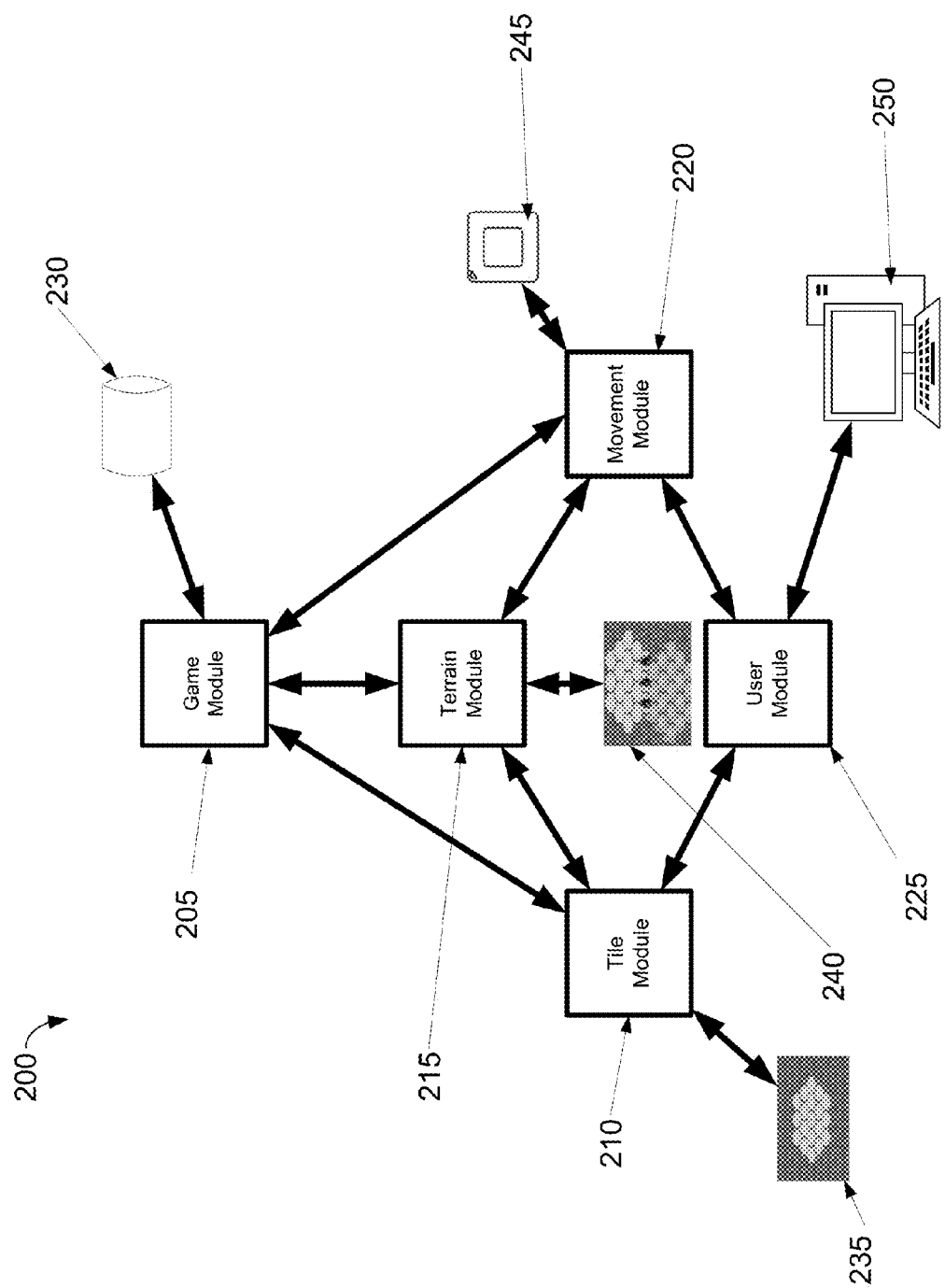
FIG. 2 illustrates the architecture of an exemplary system for a fluid mosaic terrain game, in accordance with an embodiment of the present invention.

FIG. 2 illustrates the architecture of an exemplary system for a fluid mosaic terrain game, in accordance with an embodiment of the present invention. A fluid mosaic terrain game architecture 200 comprises of a game module 205, a tile module 210, a terrain module 215, a movement module 220, and a user module 225. A game module 205 further comprises of a non-transitory computer readable medium such as a memory device 230. Memory device 230 may contain game information such as, without limitation, tile movement algorithms, fluid mosaic terrain metadata, player interaction commands, victory conditions, allowable size and rating ranges for players, map dimensions, teams, team deployment areas, times (hours) of play, units and terrain features allowed, or starting configuration of new players. A tile module 210 comprises of a terrain tile 235 which may contain information regarding and/or represent a terrain tile. Terrain tile 235 may contain information such as, but not limited to, a player-owned terrain tile 235 size, a number of game units on a terrain tile 235, a number of resources on a terrain tile 235, size and shape, units and terrain features, owner, team, list of allies, unit orders, production orders, trading transactions and communications. A terrain module comprises of a fluid mosaic terrain map 240 and contains map information such as, but not limited to, terrain properties, map boundaries, player terrain tile locations, deployment areas (for teams), current and allowable dimensions, and directional currents in fluid mortar. A movement module 220 has a means to process tile movements, such as processor 245, and may calculate any player terrain tile 235's movement across a fluid mosaic terrain map 240. A user module 225 has a means to interface with a player, such as computer terminal 250, to receive player commands and display any game information.

During typical operation, game module 205 may read a memory device 230 for game related information such as, without limitation, algorithms, data, and/or rules for a specific game. Game related information may be sent to a tile module 210, terrain module 215, and/or a movement module 220 to configure the modules for a specific game. A player may create and/or modify a terrain tile with tile module 210 by specifying tile properties such as, without limitation, tile geometry, resources, associated game units, unit movement and orders, production orders and priorities, resource targets, player alliances/friends, and tile name. A player terrain tile 235 may be sent to a terrain module 215 for placement on a fluid mosaic terrain map 240 according to any algorithms and/or rules specified for a game. Movements of terrain tiles 235 across a fluid mosaic terrain map 240 may be calculated by a movement module 220 which may calculate terrain tile movement according to algorithms and/or rules specified for a game. A user module 225 allows a player to interact with any elements of a fluid mosaic terrain game such as, but not limited to, other players, any terrain tiles 235, and a fluid mosaic terrain map 240. In some embodiments, user module 225 may also handle administrative functions related to user's account, and allows the user to interact with other users such as, but not limited to, sending voice or text messages, user note files and forums, etc. Fluid games may increase interaction between players, especially trade, which may become quite complex. In some embodiments, user module 225 may also handle trade related communications, including, but not limited to, bids, agreements, transport and even open auctions.

It may be appreciated by a person with ordinary skill in the art, in light of and in accordance with the teachings of the present invention, that memory device 230 may be virtually any memory storage device capable of storing data. Memory device 230 may be, without limitation, a hard drive, a database, a disc, a flash drive, etc. In another embodiment of the present invention, a memory device 230 may be a database accessed over a network such as the internet.

It may be appreciated by a person with ordinary skill in the art, in light of and in accordance with the teachings of the present invention, that terrain tile 235 may be virtually any information holding structure. Terrain tile 235 may be, without limitation, a physical game piece, a virtual game piece stored on a non-transitory computer readable medium, a database entry on a networked database. In another embodiment of the present invention, a terrain tile 235 may be a physical game piece that may be modularly assembled from smaller tile pieces. In an alternative embodiment of the present invention, a terrain tile 235 may be stored on a removable memory device along with any associated tile data such as game units. The removable memory device may be inserted into any computing device to and virtually added to a fluid mosaic terrain game.

It may be appreciated by a person with ordinary skill in the art, in light of and in accordance with the teachings of the present invention, that fluid mosaic terrain map 240 may be virtually any information holding structure. Fluid mosaic terrain map 240 may be, without limitation, a physical game board, a virtual game map stored on a non-transitory computer readable medium, or a database entry on a networked database. In another embodiment of the present invention, a fluid mosaic terrain map 240 may be a virtual game map stored on a non-transitory computer readable medium and running on a server. In an alternative embodiment of the present invention, a fluid mosaic terrain map 240 may be stored on a removable memory device along with any associated map data such as game resources. The removable memory device may be inserted into any computing device to and modularly expanded to an existing fluid mosaic terrain game.

It may be appreciated by a person with ordinary skill in the art, in light of and in accordance with the teachings of the present invention, that fluid mosaic terrain map 240 may be of a dynamic size. In another embodiment of the present invention, a fluid mosaic terrain map 240 may be dynamically expanded or shrunk based on the number of active players with terrain tiles playing on the fluid mosaic terrain map.

It may be appreciated by a person with ordinary skill in the art, in light of and in accordance with the teachings of the present invention, that movement module 220's means to process tile movements may be virtually any means to determine the movement of a tile. Movement module may be, without limitation, a random number generator, a series of algorithms executed by a processor, one or more dice, or a specialized hardware device. Movement algorithms may include such as, but not limited to, physical movement simulations, movement speed weighting, or game specific algorithms. In some embodiments, tiles may be moved implicitly by weighted position of units/structures on the tile, or explicitly by use of propulsive units/structures such as fans, without limitation, propellers, jets, etc. In some embodiments, regardless of the source of propulsive force, a net velocity may be inversely proportional to a mass of a tile where smaller tiles move more quickly than larger tiles. Tile movement may also be influenced in some games by directional currents in the fluid mortar. In some embodiments, games may allow rotation of tiles, sometimes controlled/influenced by users. In another embodiment of the present invention, the movement of a terrain tile may be processed by a server hosting a fluid mosaic terrain game. In yet another embodiment of the present invention, the movement of a terrain tile may be processed by a player in accordance to algorithms written in a game rule book.

It may be appreciated by a person with ordinary skill in the art, in light of and in accordance with the teachings of the present invention, that user module 225 may interface with a player virtually and/or physically. In another embodiment of the present invention, a user module 225 may interface with a user by physical means such as, without limitation, game pieces, a game board, or a player station. In another embodiment of the present invention, a user module 225 may interface with a user by virtual means such as, without limitation, a computer terminal 250, or a smartphone.

It may be appreciated by a person with ordinary skill in the art, in light of and in accordance with the teachings of the present invention, that one or more modules in a fluid mosaic terrain game architecture 200 may be embodied in one or more devices. In another embodiment of the present invention, all the modules of a fluid mosaic terrain game architecture 200 may be located in a computing platform. In yet another embodiment of the present invention, a module, such as a game module 205, may be distributed across several servers. In still another embodiment of the present invention, there may be a plurality of identical modules, such as tile module 210 and user module 225, to modularly accommodate additional players.

Figure 3:
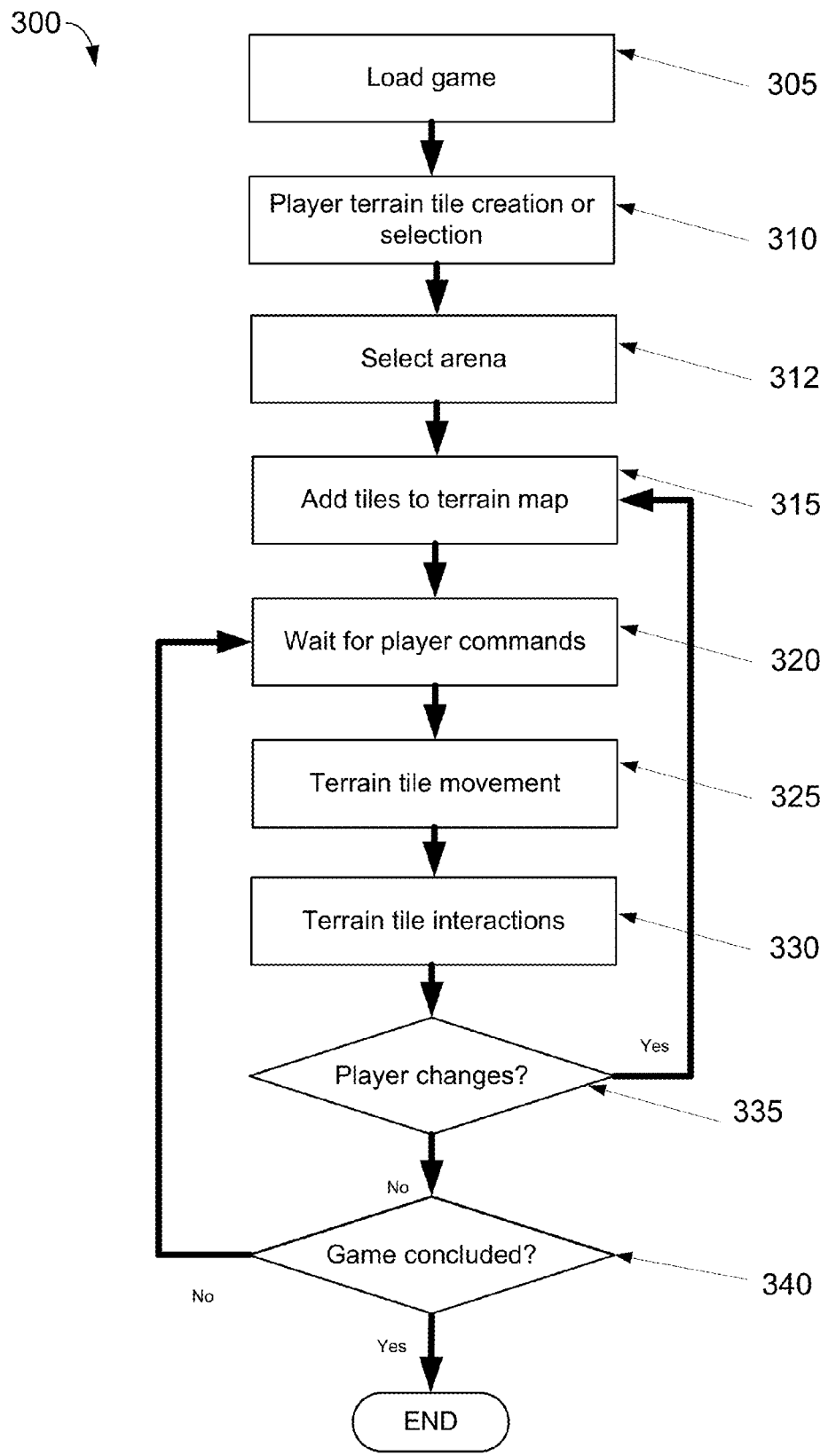
FIG. 3 is a flow chart illustrating an exemplary process for fluid mosaic terrain gaming, in accordance with an embodiment of the present invention.

FIG. 3 is a flow chart illustrating an exemplary process for fluid mosaic terrain gaming, in accordance with an embodiment of the present invention. A fluid mosaic terrain gaming process 300 begins with a load game step 305. Game information such as, without limitation, terrain maps, rules, algorithms, and resources are loaded to tile, terrain, and movement modules to configure the modules for a specific game. A player may create and/or modify a terrain tile or select a previously saved tile in a player terrain tile creation or selection step 310. Player terrain tile creation may be limited to certain configurations and/or requirements according to the game information loaded in load game step 305. An arena may be selected in a step 312. Player terrain tiles may be added and/or removed to a fluid mosaic terrain map of the selected arena in an add tiles to terrain map step 315. Algorithms for tile placement may be implemented such as, without limitation, spacing terrain tiles a certain distance apart, expanding the fluid mosaic terrain map, or shrinking the fluid mosaic terrain map. In a non-limiting example, players entering a game may create or select one or more tiles which collectively meet the requirements of the game. Although fixed terrain games typically have single contiguous areas controlled by each player, fluid mosaic games may be more dynamic and may require more adaptability from the player tiles. Players may choose a group of tiles (platoon of tiles) which can move independently. Commonly a larger dominant tile may contain the main sources of production, while smaller Tiles may be used for, without limitation, trading, transport or attack. Choosing a platoon of tiles before entering the game may allow the player to tailor his tiles for the needs of a specific game/arena. Combined with the ability of players to easily exit and reenter an ongoing game, this may provide players the ability to reconfigure their tiles in the midst of an ongoing game. In a wait for player commands step 320, a fluid mosaic terrain game system may delegate turns for players to input commands and/or allow players to perform actions on any game elements such as player terrain tiles. Terrain tiles may be moved across a fluid mosaic terrain map in a terrain tile movement step 325. Algorithms may be executed by a processing means to determine terrain tile movement and factors such as, but not limited to, game units associated to a tile, terrain type, etc. In some embodiments, tiles may be moved implicitly by weighted position of units/structures on the tile, or explicitly by use of propulsive units/structures such as fans, without limitation, propellers, jets, etc. In some embodiments, regardless of the source of propulsive force, a net velocity may be inversely proportional to a mass of a tile where smaller tiles move more quickly than larger tiles. Tile movement may also be influenced in some games by directional currents in the fluid mortar. In some embodiments, games may allow rotation of tiles, sometimes controlled/influenced by users. Terrain tiles may interact with other terrain tiles in a terrain tile interactions step 330. Terrain tile interactions may be virtually any type of interaction such as, without limitation, tile reshaping, tile merger, tile acquisition, permanent capture (transfer) of territory from one tile to another. A check for player changes step 335 checks to see if any players wish to exit or enter the on-going fluid mosaic terrain game. If changes to the current player base occur, fluid mosaic terrain gaming process 300 returns to add tiles to terrain map step 315 where player terrain tiles may be added and/or removed from the fluid mosaic terrain map. If no players wish to enter or exit the on-going fluid mosaic terrain game, a check for game conclusion step 340 is performed to determine if any game ending criteria have been fulfilled. If a game is not ending, the fluid mosaic terrain gaming process 300 returns to the wait for player commands step 320 and continues the game.

It may be appreciated by a person with ordinary skill in the art, in light of and in accordance with the teachings of the present invention, that virtually any additional function and/or related steps may be added to the fluid mosaic terrain gaming process 300. In another embodiment of the present invention, a rating function may be added to fluid mosaic terrain gaming process 300 wherein a rating score is calculated for each player after every game interaction.

It may be appreciated by a person with ordinary skill in the art, in light of and in accordance with the teachings of the present invention, that one or more steps in the fluid mosaic terrain gaming process 300 may be added, removed, or rearranged.

Figure 4:
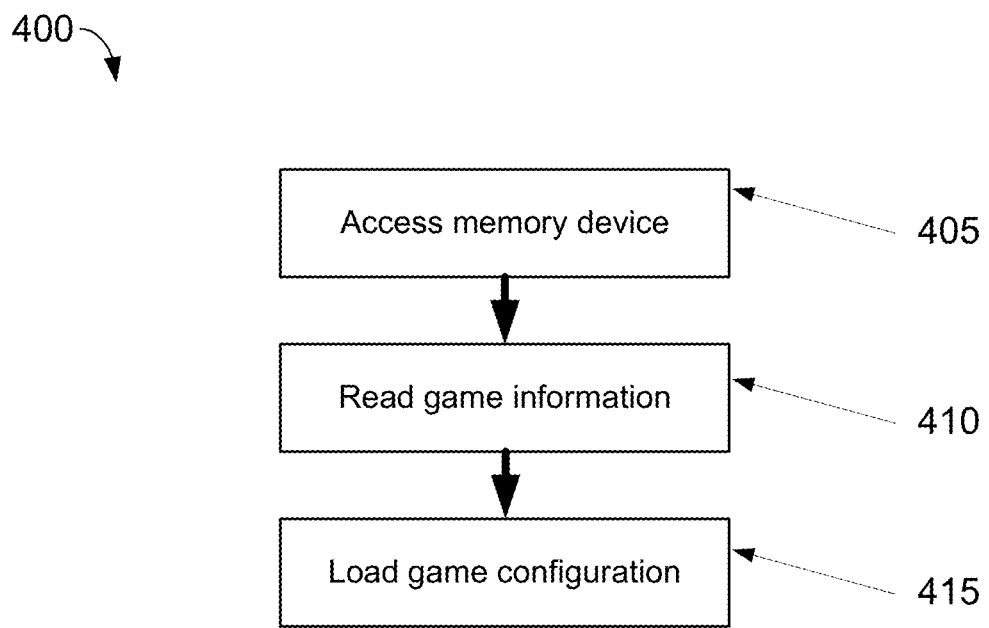
FIG. 4 is a flow chart illustrating an exemplary process for loading a game on a game module, in accordance with an embodiment of the present invention.

FIG. 4 is a flow chart illustrating an exemplary process for loading a game on a game module, in accordance with an embodiment of the present invention. A load game process 400 begins with an access memory device step 405. Game information such as, without limitation, algorithms, game resources, and rules is accessed from a memory device and/or local device memory in a read game information step 410. During load game configuration step 415, game information regarding specific game settings such as, without limitation, game rules, terrain tile properties, fluid mosaic terrain maps, may be sent to one or more fluid mosaic terrain game modules.

It may be appreciated by a person with ordinary skill in the art, in light of and in accordance with the teachings of the present invention, that the memory device accessed in access memory device step 405 may be accessed throughout a fluid mosaic terrain game. In another embodiment of the present invention, data may be written and/or read from a memory device after every player action in a fluid mosaic terrain game. It may be appreciated by a person with ordinary skill in the art, in light of and in accordance with the teachings of the present invention, that one or more steps in the load game process 400 may be added, removed, or rearranged.

Figure 5:
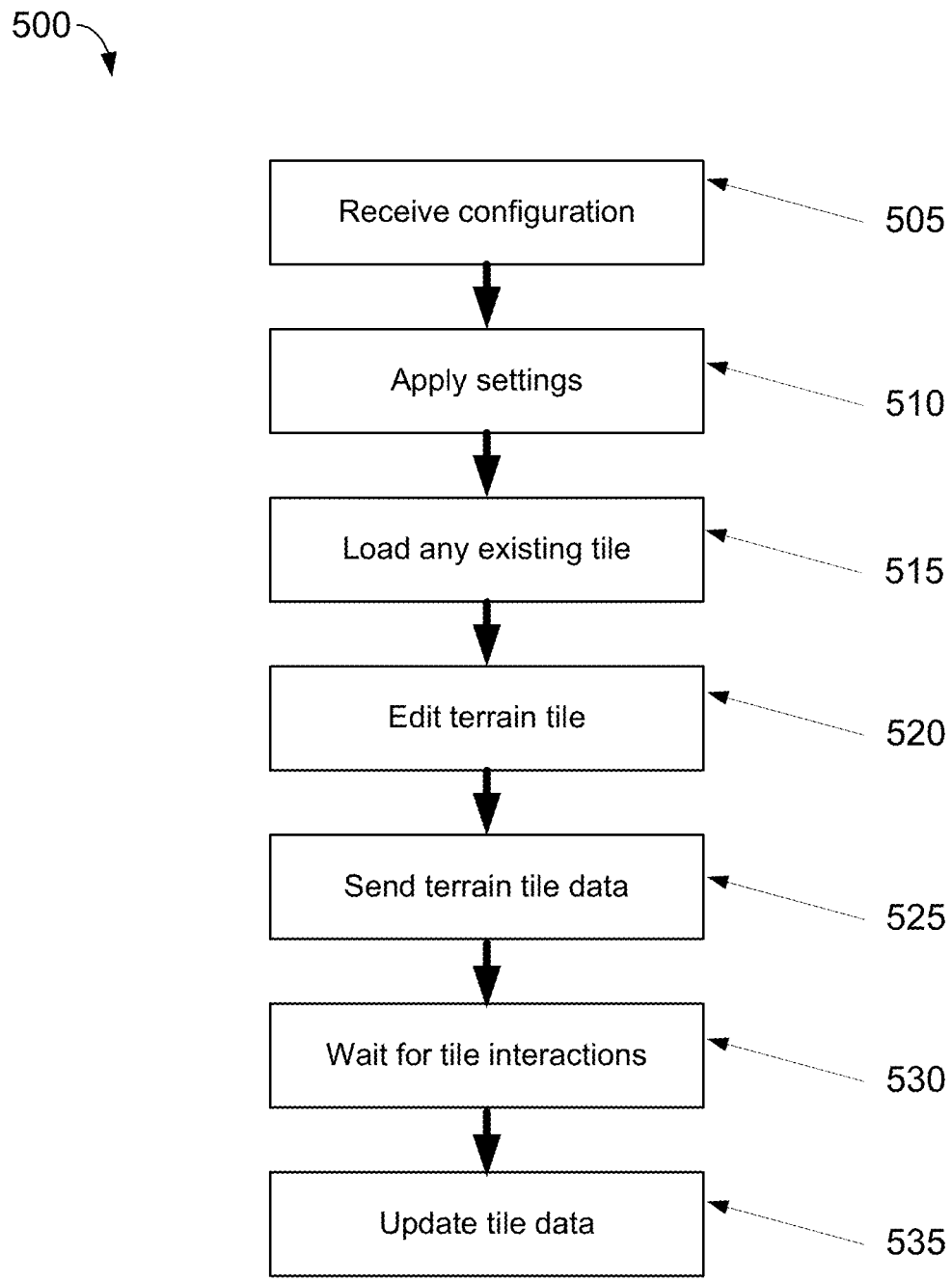
FIG. 5 is a flow chart illustrating an exemplary process for tile management on a tile module, in accordance with an embodiment of the present invention.

FIG. 5 is a flow chart illustrating an exemplary process for tile management on a tile module, in accordance with an embodiment of the present invention. A tile management process 500 begins with a receive configuration step 505.

Game specific information regarding a player's terrain tiles are received from a game module. Information such as, without limitation, player terrain tile limitations, player terrain tile geometry, player terrain tile game units, resource targets and limits, production orders, trade transactions and communications, unit movements and unit orders, may be configured by a tile module to ensure that a player's terrain tile is configured correctly for a specific game. An apply settings step 510 may apply terrain tile settings for a specific game. Settings may be, without limitation, allocating a number of resources, allocating a number of game units, specifying a terrain for a tile. A pre-made player terrain tile may be loaded in a load any existing tile step 515. A pre-made player terrain tile may be loaded from virtually any source such as, without limitation, a removable memory device, or a pre-made game piece. A player may edit a terrain tile in an edit terrain tile step 520. Edits such as, without limitation, editing terrain tile properties, geometry, or game unit composition. Terrain tile data that is ready for a specific game may be sent to a terrain module in a send terrain tile data step 525. A wait for tile interactions step 530 waits for any interactions between tiles during a game. Interactions may be, without limitation, trade between tiles, movement of tiles, battle on tiles, or movement of units and resources between tiles. Any changes to a player-owned terrain tile may be updated to a tile module in an update tile data step 535. Updates to a tile update module may be saved in virtually any manner such as, without limitation, a physical change to a game piece, or saving data to a removable memory device. It may be appreciated by a person with ordinary skill in the art, in light of and in accordance with the teachings of the present invention, that one or more steps in the tile management process 500 may be added, removed, or rearranged.

Figure 6:
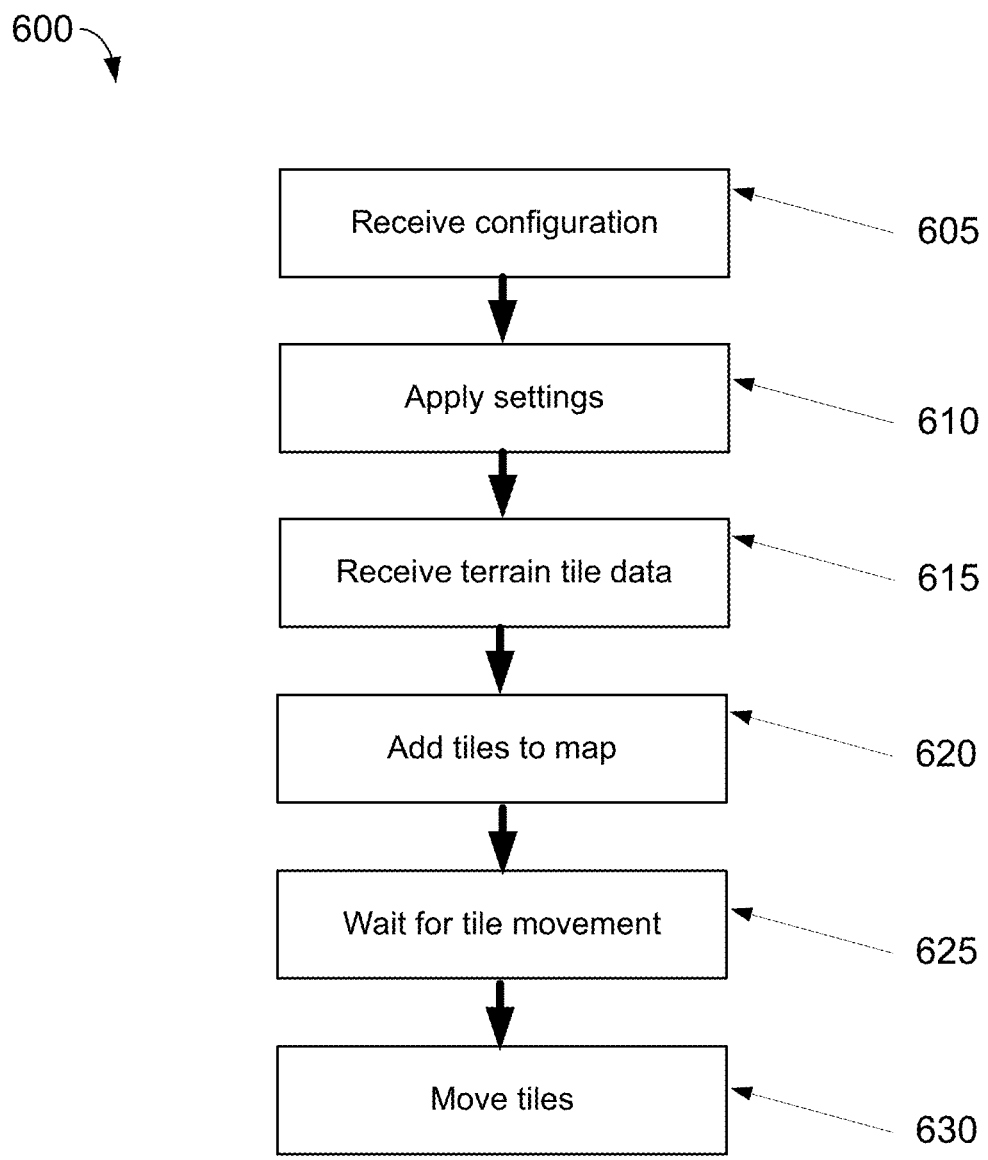
FIG. 6 is a flow chart illustrating an exemplary process for terrain interaction on a terrain module, in accordance with an embodiment of the present invention.

FIG. 6 is a flow chart illustrating an exemplary process for terrain interaction on a terrain module, in accordance with an embodiment of the present invention. A terrain management process 600 begins with a receive figuration step 605. Game specific information regarding a fluid mosaic terrain map are received from a game module. Information such as, without limitation, a fluid mosaic terrain map, or terrain properties may be used by a terrain module to configure a fluid mosaic terrain map. An apply settings step 610 applies fluid mosaic terrain game settings for a specific game to a fluid mosaic terrain map. Applied settings may be, without limitation, certain terrain tile properties or a certain number of map resources. A receive terrain tile data step 615 receives one or more player-owned terrain tiles from a tile module. The received terrain tile data may be added to a fluid mosaic terrain map in an add tiles to map step 620. Tiles may be added to a fluid mosaic terrain map according to specific game algorithms or rules contained in the game information received from the game module. A wait for tile movement step 625 waits for players to move player-owned terrain tiles across a map. A move tiles step 630 receives movement information from a movement module and moves one or more player-owned terrain tiles according to the received movement information.

It may be appreciated by a person with ordinary skill in the art, in light of and in accordance with the teachings of the present invention, that a terrain module may receive terrain tile data at virtually any point in terrain management process 600. In another embodiment of the present invention, a terrain module may add or remove terrain tile data from a fluid mosaic terrain map according to went players join or exit an on-going fluid mosaic terrain game. It may be appreciated by a person with ordinary skill in the art, in light of and in accordance with the teachings of the present invention, that one or more steps in the terrain management process 600 may be added, removed, or rearranged.

Figure 7:
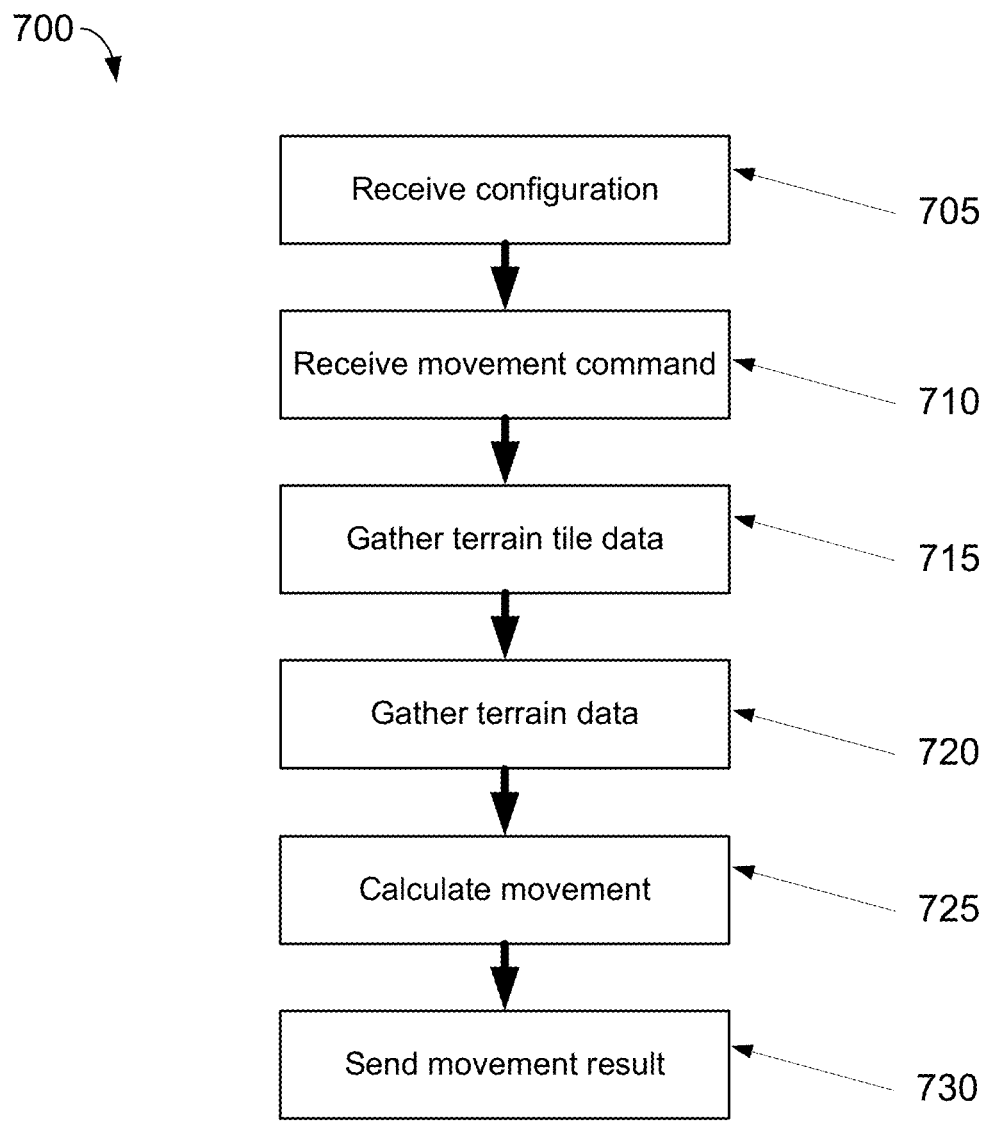
FIG. 7 is a flow chart illustrating an exemplary process for terrain movement on a movement module, in accordance with an embodiment of the present invention.

FIG. 7 is a flow chart illustrating an exemplary process for terrain movement on a movement module, in accordance with an embodiment of the present invention. A terrain movement process 700 begins with a receive configuration step 705. Game specific information regarding a tile movement may be received from a game module. Information such as, without limitation, movement algorithms may be used by a movement module to perform movement calculations. A receive movement command step 710 receives a command to move one or more terrain tiles from a player. A gather terrain tile data step 715 retrieves any necessary terrain tile data from a terrain tile involved in movement. A gather terrain data step 720 retrieves any necessary terrain data from a fluid mosaic terrain map. Gathered data in gather terrain tile data step 720 and gather terrain data step 720 may be, without limitation, terrain tile properties, or map characteristics. A calculate movement step 725 calculates a terrain tile's movement with respect to any algorithms and/or rules specified in a fluid mosaic terrain game. A send movement result step 730 sends the result of a terrain tile movement calculation to a terrain module. It may be appreciated by a person with ordinary skill in the art, in light of and in accordance with the teachings of the present invention, that one or more steps in the terrain movement process 700 may be added, removed, or rearranged.

Figure 8:
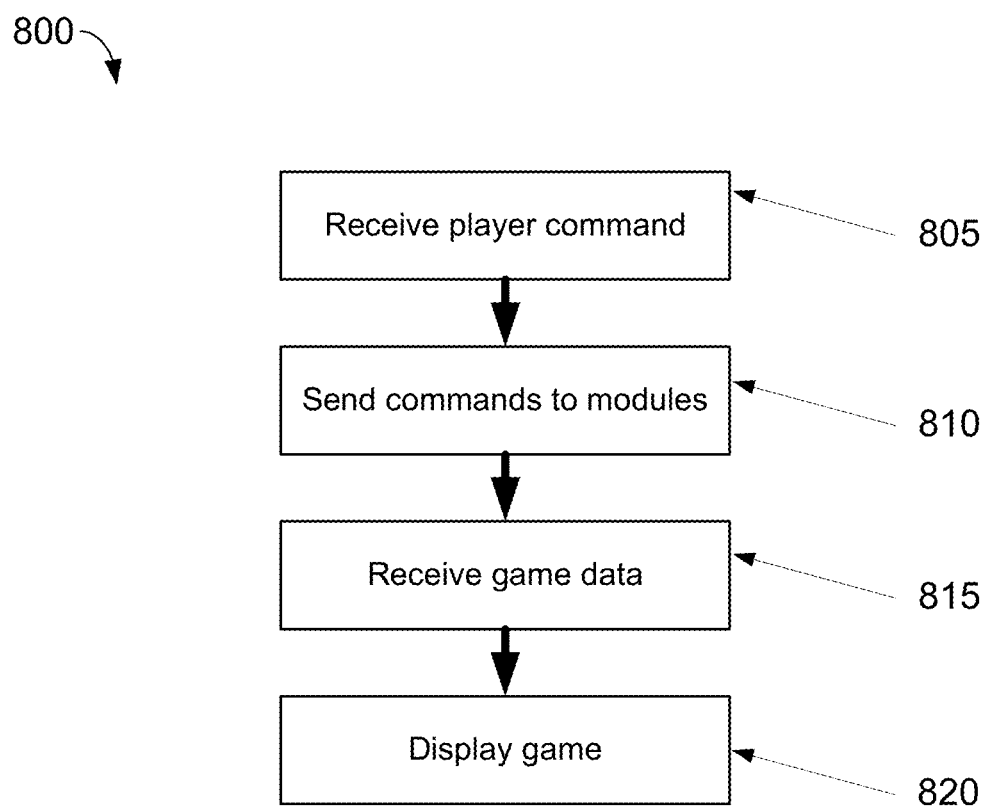
FIG. 8 is a flow chart illustrating an exemplary process for user interaction on a user module, in accordance with an embodiment of the present invention.

FIG. 8 is a flow chart illustrating an exemplary process for user interaction on a user module, in accordance with an embodiment of the present invention. A user interaction process 800 begins with a receive player command step 805. A player may enter commands for a game such as, without limitation, tile movement, tile interaction, game unit interaction, unit movement, unit orders, unit creation or upgrade, unit deployment, production orders, set resource targets, tile split, tile merger, tile remodeling orders, terrain feature creation/destruction/modification, trade orders, trade auctions and trade communications. A received command may be received and distributed to other fluid mosaic terrain game modules for execution in a send commands to modules step 810. A receive game data step 815 receives game information from one or more modules during a fluid mosaic terrain game. A display game step 820 displays information regarding a fluid mosaic terrain game a player is participating in.

It may be appreciated by a person with ordinary skill in the art, in light of and in accordance with the teachings of the present invention, that physical and/or virtual display means may be used to display a game to a player in a display game step 820. Display means may be, without limitation, a graphical user interface, a physical game representation, or a text notification. In another embodiment of the present invention, a player may be displayed game information on a graphical user interface on a smartphone device. In an alternative embodiment of the present invention, a player be notified of game events from a series of text notifications. It may be appreciated by a person with ordinary skill in the art, in light of and in accordance with the teachings of the present invention, that one or more steps in the user interaction process 800 may be added, removed, or rearranged.

Figure 9:
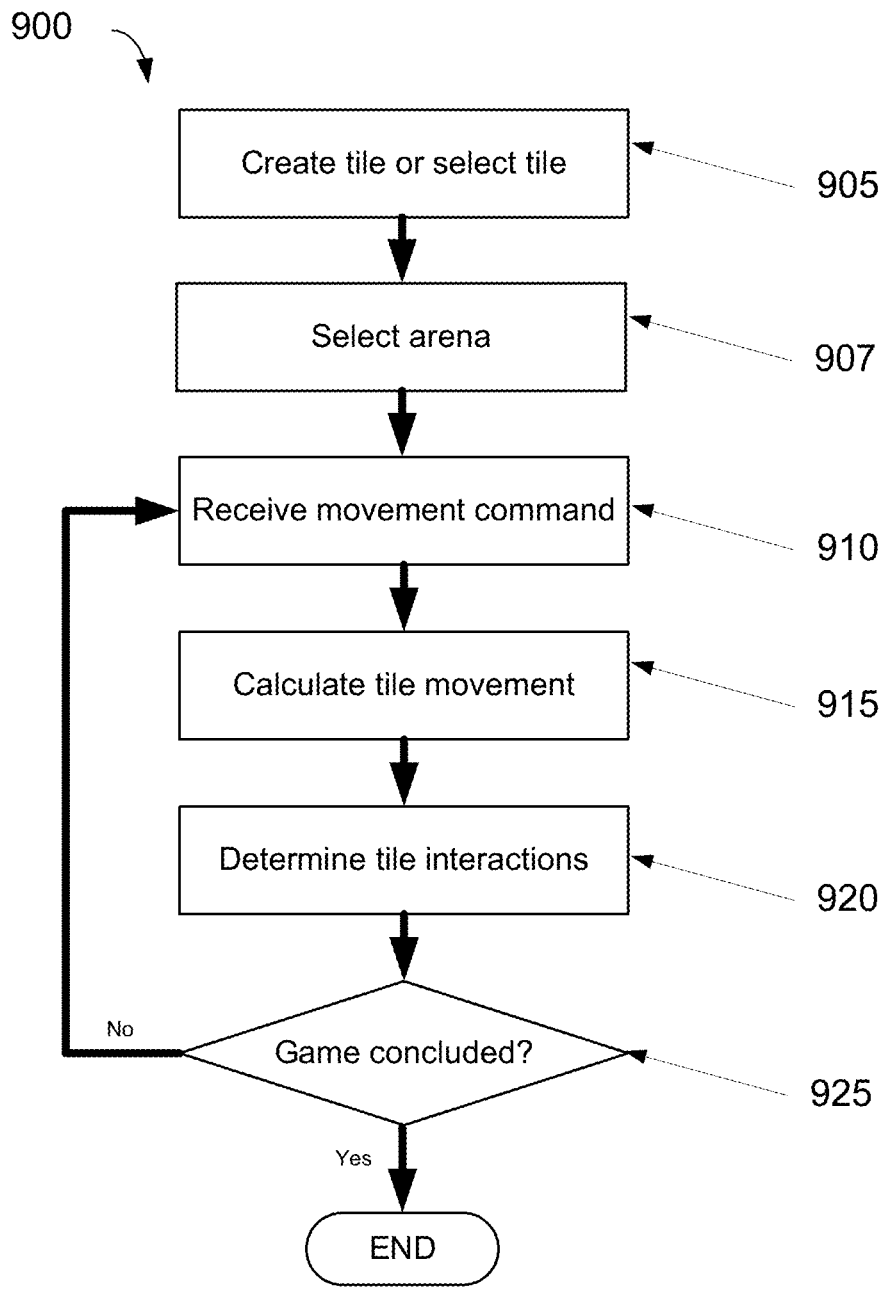
FIG. 9 is a flow chart illustrating an exemplary process for a physics game on a game module, in accordance with an embodiment of the present invention.

FIG. 9 is a flow chart illustrating an exemplary process for a physics game on a game module, in accordance with an embodiment of the present invention. A physics game process 900 begins with a create tile or select tile step 905 wherein a player tile is created or selected from a saved tile to be placed on a fluid mosaic terrain map. Create tile step

905 may allow a player to customize the size and/or shape of a player terrain tile or have a terrain tile randomly generated for a player. A receive movement command step 910 waits for a player to input a movement command such as, without limitation, sending a movement vector, or mapping a pathway. A select arena step 907 may allow the player to select an arena to play within. A calculate tile movement step 915 calculates the move of a terrain tile across a fluid mosaic terrain map by implementing a game specific movement algorithm and/or considering factors such as, without limitation, terrain tile geometry, terrain tile physics, or terrain properties. Movement algorithms may include such as, but not limited to, physical movement simulations, movement speed weighting, or game specific algorithms. In some embodiments, tiles may be moved implicitly by weighted position of units/structures on the tile, or explicitly by use of propulsive units/structures such as fans, without limitation, propellers, jets, etc. In some embodiments, regardless of the source of propulsive force, a net velocity may be inversely proportional to a mass of a tile where smaller tiles move more quickly than larger tiles. Tile movement may also be influenced in some games by directional currents in the fluid mortar. In some embodiments, games may allow rotation of tiles, sometimes controlled/influenced by users. A determine tile interactions step 920 determines any terrain tile interactions that may occur between terrain tiles and/or a fluid mosaic terrain map. Interactions may be, without limitation, terrain tile collision, terrain tile assimilation, terrain tile merger, interactions with map elements and/or resources. A check for game conclusion step 925 checks to determine if any conditions for concluding a game have been met. If no game conclusion conditions have been met, the physics game process 900 returns to receive movement command step 910.

It may be appreciated by a person with ordinary skill in the art, in light of and in accordance with the teachings of the present invention, that check for game conclusions step 925 may check for virtually any game condition as a conclusion condition. Game conclusion conditions may be, without limitation, attaining a certain score, achieving a certain terrain size, defeating an opposing player. In another embodiment of the present invention, a game may conclude after a certain amount of time elapses from the start of a game.

It may be appreciated by a person with ordinary skill in the art, in light of and in accordance with the teachings of the present invention, that one or more steps in the physics game process 900 may be added, removed, or rearranged. It may be appreciated by a person with ordinary skill in the art, in light of and in accordance with the teachings of the present invention, that one or more steps in the physics game process 900 may be performed by one or more other modules in a fluid mosaic terrain game system.

Figure 10:
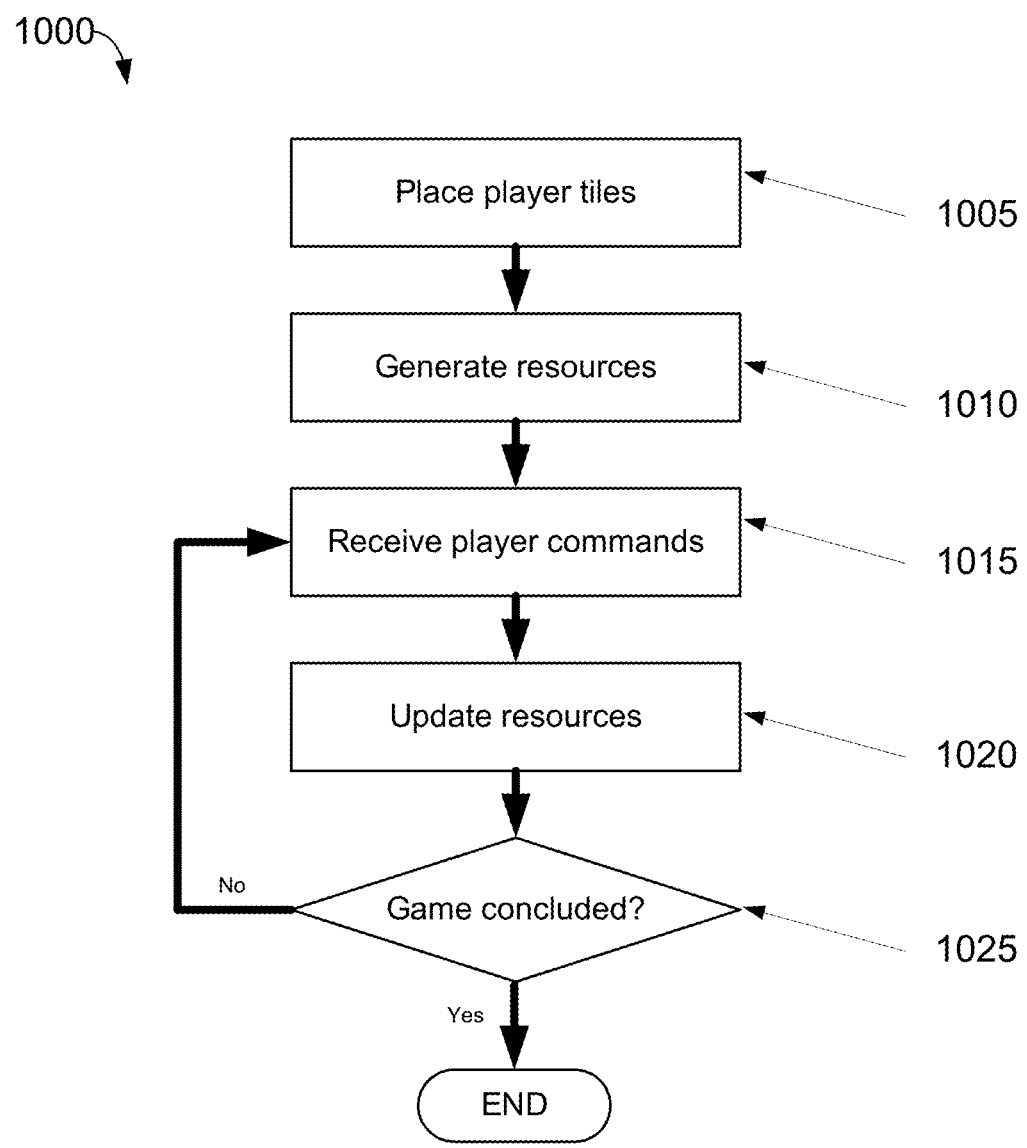
FIG. 10 is a flow chart illustrating an exemplary process for a social production game on a game module, in accordance with an embodiment of the present invention.

FIG. 10 is a flow chart illustrating an exemplary process for a social production game on a game module, in accordance with an embodiment of the present invention. A social production game process 1000 begins with a place player tiles step 1005. In place player tiles step 1005, player-owned terrain tiles are placed onto a fluid mosaic terrain map according to a game specific algorithm. A generate resources step 1010 places game resources on the fluid mosaic terrain map which players may gather to build game units. A receive player commands step 1015 receives player commands with may include, without limitation, moving terrain tiles towards resources, interacting with other players' terrain tiles, trading resources with nearby terrain tiles, unit movements, unit orders, production orders, resource targets and limits, trade and other player communications. An update resources step 1020 may update game resources such as, without limitation, fluid mosaic terrain map resources, player-owned game units, resource production and consumption, trade transactions and auctions, unit creation, unit destruction, and unit deployment. A check for game conclusion step 1025 checks to determine if any conditions for concluding a game have been met. If no game conclusion conditions have been met, the social production game process 1000 returns to receive player command step 1015.

It may be appreciated by a person with ordinary skill in the art, in light of and in accordance with the teachings of the present invention, that social production game process 1000 may emphasize social interaction. Social interaction motivators such as, without limitation, increased game progress with player interactions, reward game resources for social interactions, the mobility of fluid terrain allows tactical and strategic needs to shift rapidly, allowing more interaction and requiring more active coordination and trade between players. Allowing more efficient production if tiles specialize in one resource may encourage players to specialize, and may compel them to trade with other players for the resources they need. The creation of tightly coordinated alliances may be the most effective strategy for fluid terrain games, in contrast to fixed terrain games in which players have more isolated empires based on fixed location.

It may be appreciated by a person with ordinary skill in the art, in light of and in accordance with the teachings of the present invention, that a player tile place in place player tiles step 1005 may be loaded from a pre-existing device or randomly generated by an algorithm. In another embodiment of the present invention, a player may create a terrain tile and save the terrain tile on a removable storage device. In yet another embodiment of the present invention, a player terrain tile may be randomly generated from a templated detailed in a game.

It may be appreciated by a person with ordinary skill in the art, in light of and in accordance with the teachings of the present invention, that update resources step 1020 may update virtually any resource at any time. In another embodiment of the present invention, update resources step 1020 may update resources after a set amount of time has elapsed. In an alternative embodiment of the present invention, resources may be updated after a player has interacted with another player and/or performed a specific actions such as watching an advertisement.

It may be appreciated by a person with ordinary skill in the art, in light of and in accordance with the teachings of the present invention, that check for game conclusions step 1025 may check for virtually any game condition as a conclusion condition. Game conclusion conditions may be, without limitation, attaining a certain score, achieving a certain terrain size, defeating an opposing player, reaching a scheduled time or turns, conquering all enemy tiles, one team or player reaching a defined proportion all of game tiles, one team or player controlling a defined proportion of a defined resource.

It may be appreciated by a person with ordinary skill in the art, in light of and in accordance with the teachings of the present invention, that one or more steps in the social production game process 1000 may be added, removed, or rearranged. It may be appreciated by a person with ordinary skill in the art, in light of and in accordance with the teachings of the present invention, that one or more steps in the social production game process 1000 may be performed by one or more other modules in a fluid mosaic terrain game system.

Figure 11:
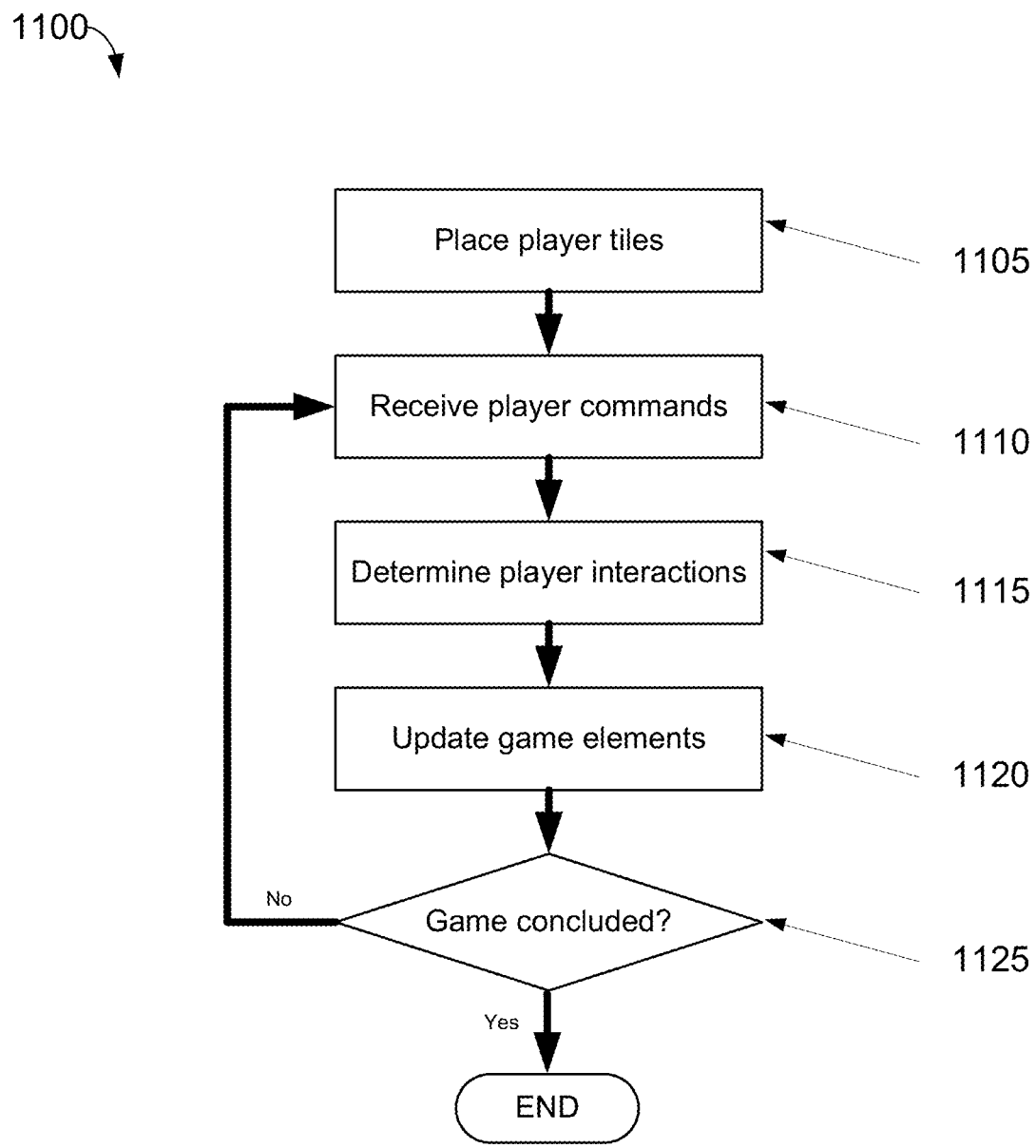
FIG. 11 is a flow chart illustrating an exemplary process for a war game on a game module, in accordance with an embodiment of the present invention.

FIG. 11 is a flow chart illustrating an exemplary process for a war game on a game module, in accordance with an embodiment of the present invention. A war game process 1100 beings with a place player tiles step 1105. Player tiles are placed on a fluid mosaic terrain map according to a game specific algorithm. A receive player commands step 1110 receives player commands such as, without limitation, moving player terrain tiles, constructing units on a player terrain tile, gathering resources near a player terrain tile, unit movement, unit orders, unit creation or upgrade, unit deployment, production orders, set resource targets, tile split, tile merger, tile remodeling orders, terrain feature creation/destruction/modification, trade orders, trade auctions and trade communications. A determine player interactions step 1115 determines the results of player interactions such as, without limitation, any change in player terrain tiles' area, any acquisition of terrain by a terrain tile, or battle between player-owned game units. In an update game elements step 1120, game resources such as, without limitation, fluid mosaic terrain map resources, player-owned game units, resource production and consumption are updated, unit production and post production deployment, completion of trade and auction transactions, terrain feature creation or destruction, tile shape or size modifications including, but not limited to, bridging and contour smoothing may be updated. A check for game conclusion step 1125 checks to determine if any conditions for concluding a game have been met. If no game conclusion conditions have been met, the war game process 1100 returns to receive player commands step 1110.

It may be appreciated by a person with ordinary skill in the art, in light of and in accordance with the teachings of the present invention, that a player tile place in place player tiles step 1105 may be loaded from a pre-existing device or randomly generated by an algorithm. In another embodiment of the present invention, a player may create a terrain tile and save the terrain tile on a removable storage device. In yet another embodiment of the present invention, a player terrain tile may be randomly generated from a templated detailed in a game.

It may be appreciated by a person with ordinary skill in the art, in light of and in accordance with the teachings of the present invention, that update resources step 1120 may update virtually any resource at any time. In another embodiment of the present invention, update resources step 1120 may update resources after a set amount of time has elapsed. In an alternative embodiment of the present invention, resources may be updated after a player has interacted with another player and/or performed a specific action such as watching an advertisement.

It may be appreciated by a person with ordinary skill in the art, in light of and in accordance with the teachings of the present invention, that check for game conclusions step 1125 may check for virtually any game condition as a conclusion condition. Game conclusion conditions may be, without limitation, attaining a certain score, achieving a certain terrain size, defeating an opposing player, reaching a scheduled time or turns, conquering all enemy tiles, one team or player reaching a defined proportion all of game tiles, one team or player controlling a defined proportion of a defined resource. In another embodiment of the present invention, a game may conclude after a certain number of game units have been destroyed.

It may be appreciated by a person with ordinary skill in the art, in light of and in accordance with the teachings of the present invention, that one or more steps in the war game process 1100 may be added, removed, or rearranged. It may be appreciated by a person with ordinary skill in the art, in light of and in accordance with the teachings of the present invention, that one or more steps in the war game process 1100 may be performed by one or more other modules in a fluid mosaic terrain game system.

Figure 12:
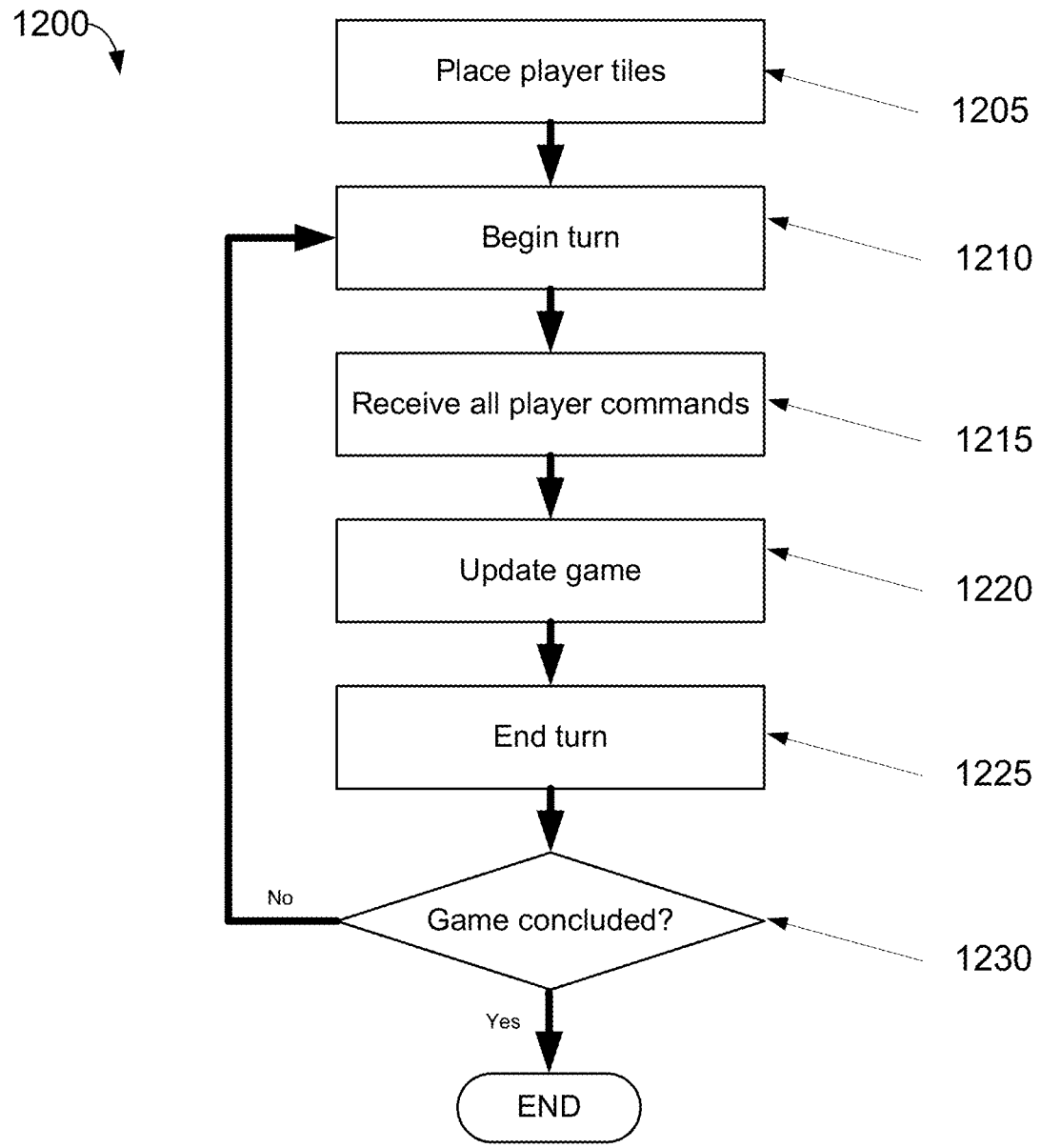
FIG. 12 is a flow chart illustrating an exemplary process for a turn-based game on a game module, in accordance with an embodiment of the present invention.

FIG. 12 is a flow chart illustrating an exemplary process for a turn-based game on a game module, in accordance with an embodiment of the present invention. A turn-based game process 1200 begins with a place player tiles step 1205. Player tiles are placed on a fluid mosaic terrain map according to a game specific algorithm. A begin turn step 1210 begins a turn of a turn-based game. A receive all player commands step 1215 receives all player commands from all participating players in the turn-based game. An update game step 1220 determines the outcome of all player commands from receive all player command step 1215. The outcome of the player commands may cause a game to be updated by events such as, without limitation, change of player terrain tiles, change of player resources, or change of player game units. An end turn step 1225 ends a turn in a turn-based game process 1200. A check for game conclusion step 1230 checks to determine if any conditions for concluding a game have been met. If no game conclusion conditions have been met, the war game process 1200 returns to receive all player commands step 1215.

It may be appreciated by a person with ordinary skill in the art, in light of and in accordance with the teachings of the present invention, that a player tile place in place player tiles step 1205 may be loaded from a pre-existing device or randomly generated by an algorithm. In another embodiment of the present invention, a player may create a terrain tile and save the terrain tile on a removable storage device. In yet another embodiment of the present invention, a player terrain tile may be randomly generated from a templated detailed in a game.

It may be appreciated by a person with ordinary skill nit he art, in light of and in accordance with the teachings of the present invention, that end turn step 1225 may include updating game resources. End turn step 1225 may update game resources such as, without limitation, refreshing game resources, progressing the development of game units, awarding resources to players, processing unit movements and orders including, without limitation, resolving attacks, processing production and consumption of resources, processing trade transactions and communications, and computing tile movements. In general, unit movement and order execution may be processed before tile movement, so that players may specify movement and attack orders based on where the units and tiles are displayed, without needing to account for later tile movement. In another embodiment of the present invention, end turn step 1225 may save and record all player actions taken during a turn for competition purposes.

It may be appreciated by a person with ordinary skill in the art, in light of and in accordance with the teachings of the present invention, that check for game conclusions step 1230 may check for virtually any game condition as a conclusion condition. Game conclusion conditions may be, without limitation, attaining a certain score, achieving a certain terrain size, defeating an opposing player, reaching a scheduled time or turns, conquering all enemy tiles, one team or player reaching a defined proportion all of game tiles, one team or player controlling a defined proportion of a defined resource. In another embodiment of the present invention, a game may conclude after a certain number of turns pass from the start of a game.

It may be appreciated by a person with ordinary skill in the art, in light of and in accordance with the teachings of the present invention, that one or more steps in the turn-based game process 1200 may be added, removed, or rearranged. It may be appreciated by a person with ordinary skill in the art, in light of and in accordance with the teachings of the present invention, that one or more steps in the turn-based game process 1200 may be performed by one or more other modules in a fluid mosaic terrain game system.

Figure 13:
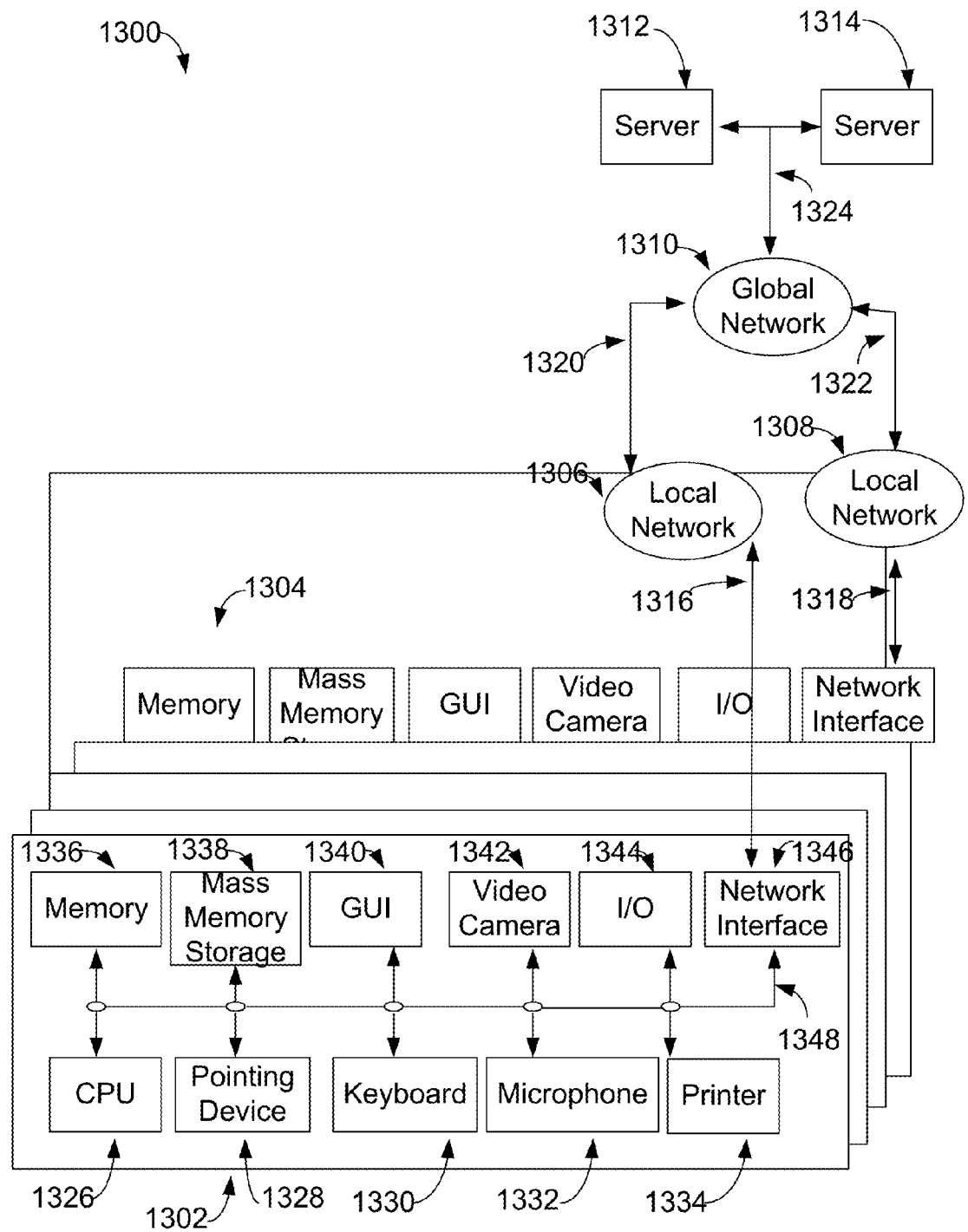
FIG. 13 is a block diagram depicting an exemplary client/server system which may be used by an exemplary web-enabled/networked embodiment of the present invention.

FIG. 13 is a block diagram depicting an exemplary client/server system which may be used by an exemplary web-enabled/networked embodiment of the present invention.

A communication system 1300 includes a multiplicity of clients with a sampling of clients denoted as a client 1302 and a client 1304, a multiplicity of local networks with a sampling of networks denoted as a local network 1306 and a local network 1308, a global network 1310 and a multiplicity of servers with a sampling of servers denoted as a server 1312 and a server 1314.

Client 1302 may communicate bi-directionally with local network 1306 via a communication channel 1316. Client 1304 may communicate bi-directionally with local network 1308 via a communication channel 1318. Local network 1306 may communicate bi-directionally with global network 1310 via a communication channel 1320. Local network 1308 may communicate bi-directionally with global network 1310 via a communication channel 1322. Global network 1310 may communicate bi-directionally with server 1312 and server 1314 via a communication channel 1324. Server 1312 and server 1314 may communicate bi-directionally with each other via communication channel 1324. Furthermore, clients 1302, 1304, local networks 1306, 1308, global network 1310 and servers 1312, 1314 may each communicate bi-directionally with each other.

In one embodiment, global network 1310 may operate as the Internet. It will be understood by those skilled in the art that communication system 1300 may take many different forms. Non-limiting examples of forms for communication system 1300 include local area networks (LANs), wide area networks (WANs), wired telephone networks, wireless networks, or any other network supporting data communication between respective entities.

Clients 1302 and 1304 may take many different forms. Non-limiting examples of clients 1302 and 1304 include personal computers, personal digital assistants (PDAs), cellular phones and smartphones.

Client 1302 includes a CPU 1326, a pointing device 1328, a keyboard 1330, a microphone 1332, a printer 1334, a memory 1336, a mass memory storage 1338, a GUI 1340, a video camera 1342, an input/output interface 1344, and a network interface 1346.

CPU 1326, pointing device 1328, keyboard 1330, microphone 1332, printer 1334, memory 1336, mass memory storage 1338, GUI 1340, video camera 1342, input/output interface 1344 and network interface 1346 may communicate in a unidirectional manner or a bi-directional manner with each other via a communication channel 1348. Communication channel 1348 may be configured as a single communication channel or a multiplicity of communication channels.

CPU 1326 may be comprised of a single processor or multiple processors. CPU 1326 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1336 is used typically to transfer data and instructions to CPU 1326 in a bi-directional manner. Memory 1336, as discussed previously, may include any suitable computer-readable media, intended for data storage, such as those described above excluding any wired or wireless transmissions unless specifically noted. Mass memory storage 1338 may also be coupled bi-directionally to CPU 1326 and provides additional data storage capacity and may include any of the computer-readable media described above. Mass memory storage 1338 may be used to store programs, data and the like and is typically a secondary storage medium such as a hard disk. It will be appreciated that the information retained within mass memory storage 1338, may, in appropriate cases, be incorporated in standard fashion as part of memory 1336 as virtual memory.

CPU 1326 may be coupled to GUI 1340. GUI 1340 enables a user to view the operation of computer operating system and software. CPU 1326 may be coupled to pointing device 1328. Non-limiting examples of pointing device 1328 include computer mouse, trackball and touchpad. Pointing device 1328 enables a user with the capability to maneuver a computer cursor about the viewing area of GUI 1340 and select areas or features in the viewing area of GUI 1340. CPU 1326 may be coupled to keyboard 1330. Keyboard 1330 enables a user with the capability to input alphanumeric textual information to CPU 1326. CPU 1326 may be coupled to microphone 1332. Microphone 1332 enables audio produced by a user to be recorded, processed and communicated by CPU 1326. CPU 1326 may be connected to printer 1334. Printer 1334 enables a user with the capability to print information to a sheet of paper. CPU 1326 may be connected to video camera 1342. Video camera 1342 enables video produced or captured by user to be recorded, processed and communicated by CPU 1326.

CPU 1326 may also be coupled to input/output interface 1344 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1326 optionally may be coupled to network interface 1346 which enables communication with an external device such as a database or a computer or telecommunications or internet network using an external connection shown generally as communication channel 1316, which may be implemented as a hardwired or wireless communications link using suitable conventional technologies. With such a connection, CPU 1326 might receive information from the network, or might output information to a network in the course of performing the method steps described in the teachings of the present invention.

Figure 14:
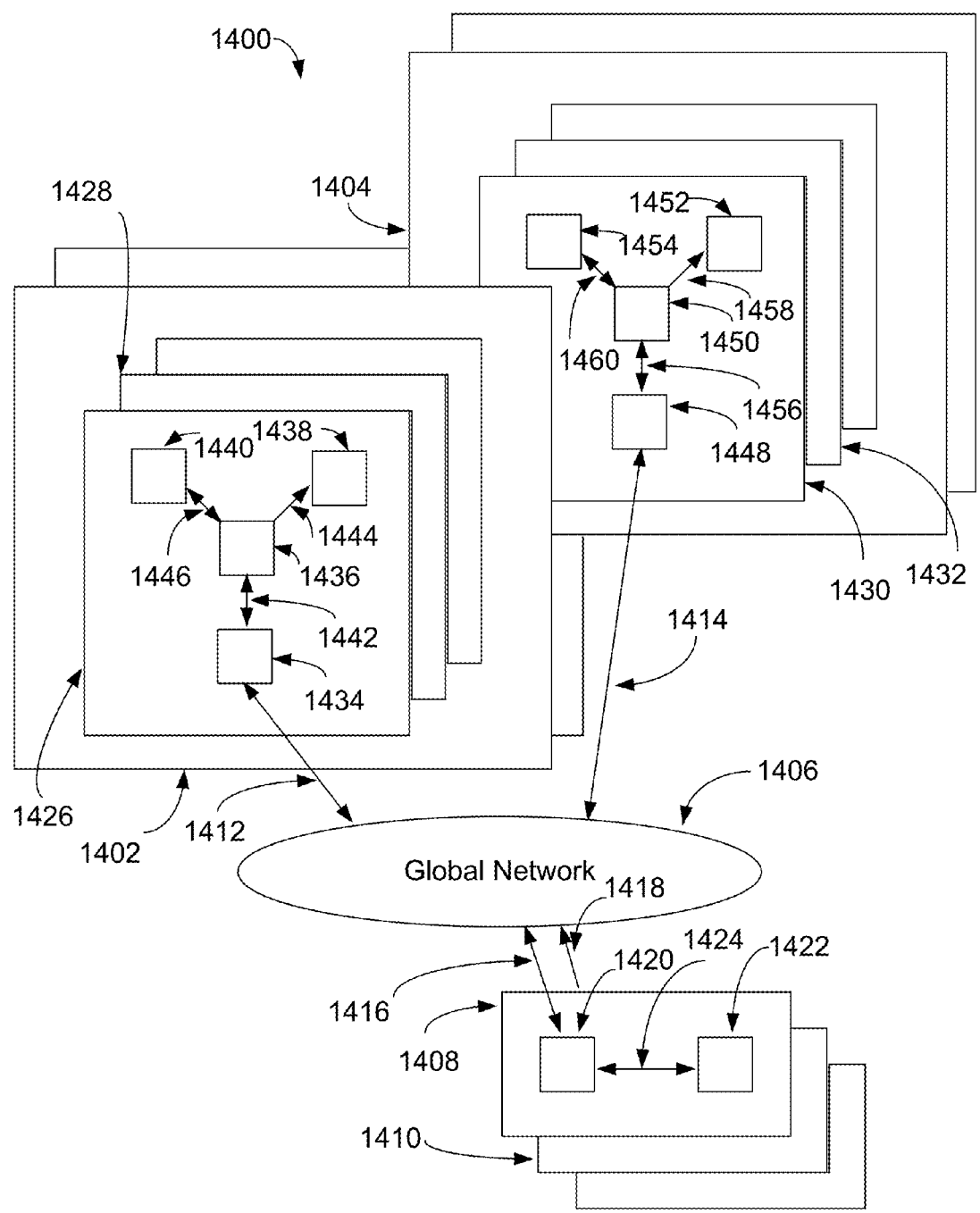
FIG. 14 illustrates a block diagram depicting a conventional client/server communication system.

FIG. 14 illustrates a block diagram depicting a conventional client/server communication system. A communication system 1400 includes a multiplicity of networked regions with a sampling of regions denoted as a network region 1402 and a network region 1404, a global network 1406 and a multiplicity of servers with a sampling of servers denoted as a server device 1408 and a server device 1410.

Network region 1402 and network region 1404 may operate to represent a network contained within a geographical area or region. Non-limiting examples of representations for the geographical areas for the networked regions may include postal zip codes, telephone area codes, states, counties, cities and countries. Elements within network region 1402 and 1404 may operate to communicate with external elements within other networked regions or within elements contained within the same network region.

In some implementations, global network 1406 may operate as the Internet. It will be understood by those skilled in the art that communication system 1400 may take many different forms. Non-limiting examples of forms for communication system 1400 include local area networks (LANs), wide area networks (WANs), wired telephone networks, cellular telephone networks or any other network supporting data communication between respective entities via hardwired or wireless communication networks. Global network 1406 may operate to transfer information between the various networked elements.

Server device 1408 and server device 1410 may operate to execute software instructions, store information, support database operations and communicate with other networked elements. Non-limiting examples of software and scripting languages which may be executed on server device 1408 and server device 1410 include C, C++, C# and Java.

Network region 1402 may operate to communicate bi-directionally with global network 1406 via a communication channel 1412. Network region 1404 may operate to communicate bi-directionally with global network 1406 via a communication channel 1414. Server device 1408 may operate to communicate bi-directionally with global network 1406 via a communication channel 1416. Server device 1410 may operate to communicate bi-directionally with global network 1406 via a communication channel 1418. Network region 1402 and 1404, global network 1406 and server devices 1408 and 1410 may operate to communicate with each other and with every other networked device located within communication system 1400.

Server device 1408 includes a networking device 1420 and a server 1422. Networking device 1420 may operate to communicate bi-directionally with global network 1406 via communication channel 1416 and with server 1422 via a communication channel 1424. Server 1422 may operate to execute software instructions and store information.

Network region 1402 includes a multiplicity of clients with a sampling denoted as a client 1426 and a client 1428. Client 1426 includes a networking device 1434, a processor 1436, a GUI 1438 and an interface device 1440. Non-limiting examples of devices for GUI 1438 include monitors, televisions, cellular telephones, smartphones and PDAs (Personal Digital Assistants). Non-limiting examples of interface device 1440 include pointing device, mouse, trackball, scanner and printer. Networking device 1434 may communicate bi-directionally with global network 1406 via communication channel 1412 and with processor 1436 via a communication channel 1442. GUI 1438 may receive information from processor 1436 via a communication channel 1444 for presentation to a user for viewing. Interface device 1440 may operate to send control information to processor 1436 and to receive information from processor 1436 via a communication channel 1446. Network region 1404 includes a multiplicity of clients with a sampling denoted as a client 1430 and a client 1432. Client 1430 includes a networking device 1448, a processor 1450, a GUI 1452 and an interface device 1454. Non-limiting examples of devices for GUI 1438 include monitors, televisions, cellular telephones, smartphones and PDAs (Personal Digital Assistants). Non-limiting examples of interface device 1440 include pointing devices, mousse, trackballs, scanners and printers. Networking device 1448 may communicate bi-directionally with global network 1406 via communication channel 1414 and with processor 1450 via a communication channel 1456. GUI 1452 may receive information from processor 1450 via a communication channel 1458 for presentation to a user for viewing. Interface device 1454 may operate to send control information to processor 1450 and to receive information from processor 1450 via a communication channel 1460.

For example, consider the case where a user interfacing with client 1426 may want to execute a networked application. A user may enter the IP (Internet Protocol) address for the networked application using interface device 1440. The IP address information may be communicated to processor 1436 via communication channel 1446. Processor 1436 may then communicate the IP address information to networking device 1434 via communication channel 1442. Networking device 1434 may then communicate the IP address information to global network 1406 via communication channel 1412. Global network 1406 may then communicate the IP address information to networking device 1420 of server device 1408 via communication channel 1416. Networking device 1420 may then communicate the IP address information to server 1422 via communication channel 1424. Server 1422 may receive the IP address information and after processing the IP address information may communicate return information to networking device 1420 via communication channel 1424. Networking device 1420 may communicate the return information to global network 1406 via communication channel 1416. Global network 1406 may communicate the return information to networking device 1434 via communication channel 1412. Networking device 1434 may communicate the return information to processor 1436 via communication channel 1442. Processor 1446 may communicate the return information to GUI 1438 via communication channel 1444. User may then view the return information on GUI 1438.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing fluid mosaic terrain games according to the present invention will be apparent to those skilled in the art. Various aspects of the invention have been described above by way of illustration, and the specific embodiments disclosed are not intended to limit the invention to the particular forms disclosed. The particular implementation of the fluid mosaic terrain games may vary depending upon the particular context or application. By way of example, and not limitation, the fluid mosaic terrain games described in the foregoing were principally directed to terrain based strategy game implementations; however, similar techniques may instead be applied to crowd simulators, war simulators, urban planning, or construction design, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A computer implemented environment including a non-transitory computer-readable storage medium with an executable program stored thereon, wherein the program instructs one or more processors to perform a method comprising the steps of:
    loading a predetermined game including game information on a game module, said predetermined game comprises a terrain tile, a fluid mosaic terrain, and a plurality of game units, wherein said game information including at least one of, a fluid mosaic terrain map, a game rule, algorithms, and resources are loaded to at least one of, a tile module, a terrain module, and a movement module, to configure the modules for said predetermined game;
    loading a player terrain tile to said terrain module for placement on said fluid mosaic terrain map, said player terrain tile is configured to be operable for moving across said fluid mosaic terrain map, wherein a movement of said player terrain tile is calculated by said movement module;
    in which said fluid mosaic terrain map comprises map information including at least one of, a terrain property, a map boundary, a player terrain tile location, a deployment area, a current and allowable dimension, and a directional current in a fluid mortar;
    assembling a player terrain tile on said fluid mosaic terrain map, said player terrain tile at least comprises a plurality of terrain tiles, wherein said plurality of terrain tiles are configured to move independently;
    adding the player terrain tile to said fluid mosaic terrain, said step of adding said player terrain tile comprises at least one of, spacing player terrain tiles a certain distance apart, expanding said fluid mosaic terrain, or shrinking said fluid mosaic terrain;
    moving the player terrain tile across said fluid mosaic terrain, wherein said movement of said player terrain tile across said fluid mosaic terrain is based on at least one of, a game unit associated to a player terrain tile, a terrain type, a weighted position of units or structures on said player terrain tile, and a directional current in a fluid mortar; and
    processing an interaction of the plurality of terrain tiles when a predetermined distance is reached between two or more of said plurality of terrain tiles, said interaction comprises at least one of, capturing an area from a terrain tile, removing or adding a game unit to a terrain tile, changing the geometry of a terrain tile, and moving a game unit or resource from one tile to another, for purposes of combat or trade.

2. The method as recited in claim 1, further comprising the step of receiving at least one command, wherein the received command at least comprises a movement command, the movement command comprises moving one or more player terrain tiles, said movement command further comprises:
    receiving game information regarding said player terrain tile movement from said game module;
    retrieving player terrain tile data from a player terrain tile involved in said movement from said fluid mosaic terrain map;
    calculating movement of said player terrain tile involved in said movement from said fluid mosaic terrain map;
    sending a result of said movement calculation to said terrain module.

3. The method as recited in claim 2, further comprising the step of receiving a selection for an arena, wherein the player terrain tile is added within the selected arena.

4. The method as recited in claim 2, further comprising the step of determining an exit of a participating player from the computer implemented environment, wherein the participating player terrain tile is saved, removed from the computer implemented environment and a virtual size of the computer implemented environment decreases.

5. The method as recited in claim 2, in which said processing tile interaction changes virtual sizes of the player terrain tile and the at least one of the plurality of tiles.

6. The method as recited in claim 2, in which the player terrain further comprises a platoon of tiles, the platoon of tiles being configurable for interactions with at least one of the plurality of terrain tiles.

7. The method as recited in claim 2, in which the tile interaction occurs during contact of the player terrain tile with at least one of the plurality of terrain tiles.

8. The method as recited in claim 2, in which a contour of the player terrain tile is configurable.

9. The method as recited in claim 1, further comprising the steps of: receiving at least one command, wherein the received command at least comprises a movement command, the movement command at least in part affecting said moving; receiving a selection for an arena, wherein the player terrain tile is added within the selected arena; and determining an exit of a participating player from the computer implemented environment, wherein the player terrain tile is saved, removed from the computer implemented environment and a virtual size of the computer implemented environment decreases, and in which: said processing tile interaction changes virtual sizes of the player terrain tile and the at least one of the plurality of tiles; the player terrain further comprises a platoon of tiles, the platoon of tiles being configurable for distribution of the individual positional elements for interactions with at least one of the plurality of terrain tiles; the tile interaction occurs after relative movement places the player terrain tile in contact with at least one of the plurality of terrain tiles and bridges form connecting the player terrain tile and the least one of the plurality of terrain tiles; and a contour of the player terrain tile is configurable for smoothing.

10. A computer implemented environment including a non-transitory computer-reader storage medium with an executable program stored thereon, wherein the program instructs one or more processors to perform a method comprising:
  steps for loading a predetermined game including game information on a game module, said predetermined game comprises a terrain tile, a fluid mosaic terrain, and a plurality of game units, wherein said game information including at least one of, a fluid mosaic terrain map, a game rule, algorithms, and resources are loaded to at least one of, a tile module, a terrain module, and a movement module, to configure the modules for said predetermined game;
  steps for loading a player terrain tile to said terrain module for placement on said fluid mosaic terrain map, said player terrain tile is configured to be operable for moving across said fluid mosaic terrain map, wherein a movement of said player terrain tile is calculated by said movement module;
  in which said fluid mosaic terrain map comprises map information including at least one of, a terrain property, a map boundary, a player terrain tile location, a deployment area, a current and allowable dimension, and a directional current in a fluid mortar;
  steps for assembling said player terrain tile to said fluid mosaic terrain map;
  steps for adding the player terrain tile to said fluid mosaic terrain map, said step of adding said player terrain the comprises at least one of, spacing player terrain tiles a certain distance apart, expanding said fluid mosaic terrain map, or shrinking said fluid mosaic terrain map;
  steps for moving the player terrain tile within said fluid mosaic terrain, in which said player terrain tile comprises at least a plurality of player tiles, wherein said movement of said player terrain tile across said fluid mosaic terrain is based on at least one of, a game unit associated to a player terrain tile, a terrain type, a weighted position of units or structures on said player terrain tile, and a directional current in a fluid mortar; and
  steps for processing an interaction of said plurality of player tiles when a predetermined distance is reached between two or more of said plurality of terrain tiles, said interaction comprises at least one of, capturing an area from a terrain tile, removing or adding a game unit to a terrain tile, changing the geometry of a terrain tile, and moving a game unit or resource from one tile to another, for purposes of combat or trade.

11. The method as recited in claim 10, further comprising steps for receiving at least one movement command, said movement command comprises
  receiving game information regarding said player terrain tile movement from said game module;
  retrieving player terrain tile data from a player terrain tile involved in said movement from said fluid mosaic terrain map;
  calculating movement of said player terrain tile involved in said movement from said fluid mosaic terrain map;
  sending a result of said movement calculation to said terrain module.

12. The method as recited in claim 11, further comprising steps for receiving a selection for an arena.

13. The method as recited in claim 11, further comprising steps for determining an exit of a participating player from the computer implemented environment.

14. A non-transitory computer-readable storage medium with an executable program stored thereon, wherein the program instructs one or more processors to perform the following steps:
  loading a predetermined game including game information on a game module, said predetermined game comprises a terrain tile, a fluid mosaic terrain, and a plurality of game units, wherein said game information including at least one of, a fluid mosaic terrain map, a game rule, algorithms, and resources are loaded to at least one of, a tile module, a terrain module, and a movement module, to configure the modules for said predetermined game;
  loading a player terrain tile to said terrain module for placement on said fluid mosaic terrain map, said player terrain tile is configured to be operable for moving across said fluid mosaic terrain map, wherein a movement of said player terrain tile is calculated by said movement module;
  in which said fluid mosaic terrain map comprises map information including at least one of, a terrain property, a map boundary, a player terrain tile location, a deployment area, a current and allowable dimension, and a directional current in a fluid mortar;
  assembling a player terrain tile to said fluid mosaic terrain map, said player terrain tile comprises at least a plurality of terrain tiles, wherein said plurality of terrain tiles are configured to move independently;
  adding the player terrain tile to said fluid mosaic terrain, said step of adding said player terrain tile comprises at least one of, spacing player terrain tiles a certain distance apart, expanding said fluid mosaic terrain, or shrinking said fluid mosaic terrain;

moving the player terrain tile within said fluid mosaic terrain map, wherein said movement of said player terrain tile across said fluid mosaic terrain map is based on at least one of, a game unit associated to a player terrain tile, a terrain type, a weighted position of units or structures on said player terrain tile, and a directional current in a fluid mortar; and processing an interaction between said plurality of terrain tiles when a predetermined distance is reached between two or more of said plurality of terrain tiles, wherein said interaction may comprise at least one of, a tile reshaping step, a tile merger step, a tile acquisition step, and a permanent capture or transfer step of territory from one tile to another.

15. The program instructing the one or more processors as recited in claim 14, further comprising the step of receiving at least one command, wherein the received commands at least comprises a movement command, the movement command comprises:

receiving game information regarding said player terrain tile precious movement from said game module;

retrieving player terrain tile data from a player terrain tile involved in said movement from said fluid mosaic terrain map;

calculating movement of said player terrain tile involved in said movement from said fluid mosaic terrain map;

sending a result of said movement calculation to said terrain module.

16. The program instructing the one or more processors as recited in claim 15, further comprising the step of receiving a selection for an arena, wherein the player terrain tile is added within the selected arena.

17. The program instructing the one or more processors as recited in claim 15, further comprising the step of determining an exit of a participating player from the computer implemented environment, wherein the participating player terrain tile is saved, removed from the computer implemented environment and a virtual size of the computer implemented environment decreases.

18. The program instructing the one or more processors as recited in claim 15, in which said processing tile interaction changes virtual sizes of the player terrain tile and the at least one of the plurality of tiles.

19. The program instructing the one or more processors as recited in claim 15, in which the player terrain further comprises a platoon of tiles, the platoon of tiles being configurable for interactions with at least one of the plurality of terrain tiles.

20. The program instructing the one or more processors as recited in claim 15, in which a contour of the player terrain tile is configurable.

* * * * *